(12) United States Patent
Hannart et al.

(10) Patent No.: US 12,086,531 B2
(45) Date of Patent: Sep. 10, 2024

(54) METHOD AND SYSTEM FOR AUTOMATIC FORMATTING OF PRESENTATION SLIDES

(71) Applicant: 11089161 CANADA INC., Montreal (CA)

(72) Inventors: Alexis Hannart, Montreal (CA); Jean-Élie Aron, Montreal (CA); Pierre Magrangeas, Paris (FR)

(73) Assignee: 11089161 CANADA INC. (CA)

( * ) Notice: Subject to any disclaimer, the term of this patent is extended or adjusted under 35 U.S.C. 154(b) by 0 days.

(21) Appl. No.: 17/875,938

(22) Filed: Jul. 28, 2022

(65) Prior Publication Data

US 2023/0041867 A1     Feb. 9, 2023

Related U.S. Application Data

(60) Provisional application No. 63/226,687, filed on Jul. 28, 2021.

(51) Int. Cl.
*G06F 17/00* (2019.01)
*G06F 40/106* (2020.01)

(52) U.S. Cl.
CPC ................. *G06F 40/106* (2020.01)

(58) Field of Classification Search
CPC .... G06F 40/106; G06F 16/258; G06F 3/0486; G06F 3/04845; G06F 3/04883; G06F 40/103; G06F 40/166; G06T 13/80
USPC ........................................................ 715/208
See application file for complete search history.

(56) References Cited

U.S. PATENT DOCUMENTS

| 10,460,023 | B1* | 10/2019 | Shriver | ................. G06F 40/117 |
| 2008/0288890 | A1* | 11/2008 | Anderson | .......... H04N 21/2743 715/810 |
| 2009/0044095 | A1* | 2/2009 | Berger | ................. G06F 16/258 715/226 |
| 2010/0088605 | A1 | 4/2010 | Livshin et al. | |
| 2010/0118037 | A1* | 5/2010 | Sheikh | .................... G06T 13/80 345/473 |

(Continued)

OTHER PUBLICATIONS

International Search Report and Written Opinion in related PCT Application No. PCT/CA2022/051160, dated Oct. 21, 2022, 10 pages.

*Primary Examiner* — Jason T Edwards
(74) *Attorney, Agent, or Firm* — Dilworth IP, LLC

(57) ABSTRACT

Various embodiments provided herein relate to a method and system for automatic formatting of presentation slides. In at least one embodiment, the method comprises receiving an input slide, the input slide comprising one or more objects having a first slide layout configuration; determining metadata associated with the input slide, the determined metadata corresponding to property features of the one or more objects; analyzing the metadata to classify the one or more objects; identifying one or more slide layout functional objectives; based on the one or more slide layout functional objectives, applying one or more transformations to the detected objects, wherein each transformation comprises adjusting the metadata corresponding to the one or more detected objects to generate one or more adjusted objects; and generating a modified slide, the modified slide comprising one or more adjusted objects having a second slide layout configuration.

14 Claims, 23 Drawing Sheets

(56) References Cited

U.S. PATENT DOCUMENTS

| | | | |
|---|---|---|---|
| 2013/0205202 A1* | 8/2013 | Xiao | G06F 40/117 |
| | | | 715/249 |
| 2017/0185590 A1* | 6/2017 | Tetreault | G06F 40/56 |
| 2018/0129634 A1 | 5/2018 | Sivaji et al. | |
| 2018/0189667 A1 | 7/2018 | Tsou et al. | |
| 2019/0004686 A1* | 1/2019 | Hamlin | G06F 3/0486 |
| 2019/0034765 A1 | 1/2019 | Kaehler et al. | |
| 2019/0087780 A1* | 3/2019 | Cerqueira | G06V 30/413 |
| 2019/0114047 A1 | 4/2019 | Kikin-Gil et al. | |
| 2019/0258895 A1 | 8/2019 | Sacheti et al. | |
| 2021/0076105 A1* | 3/2021 | Parmar | G06F 3/0425 |
| 2021/0081822 A1 | 3/2021 | Davidson et al. | |

* cited by examiner

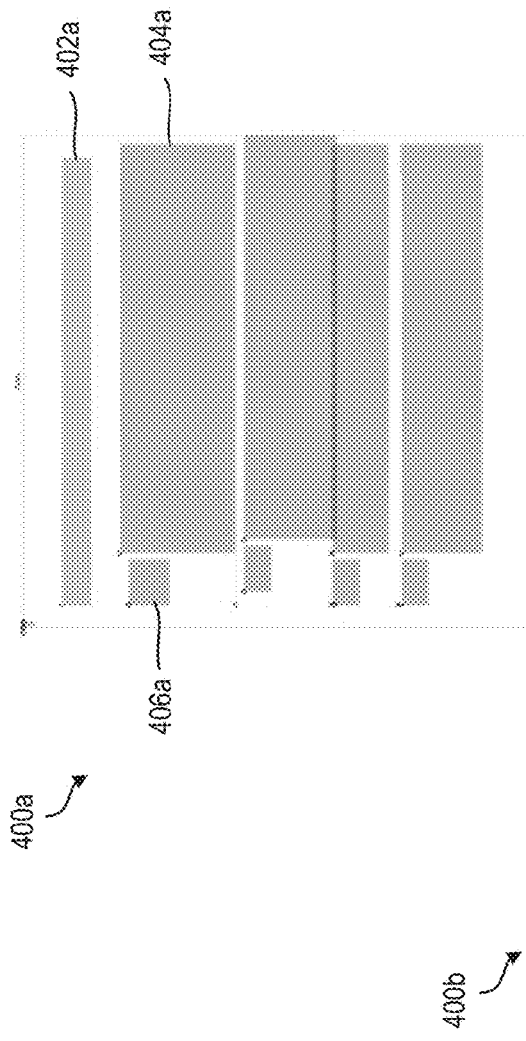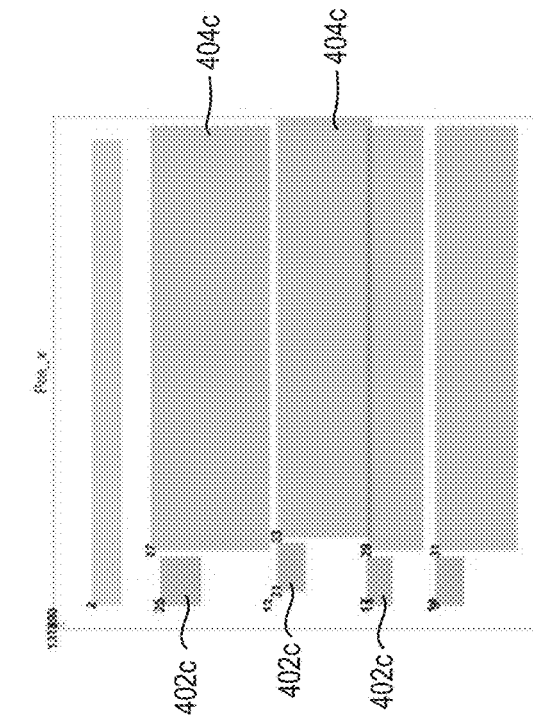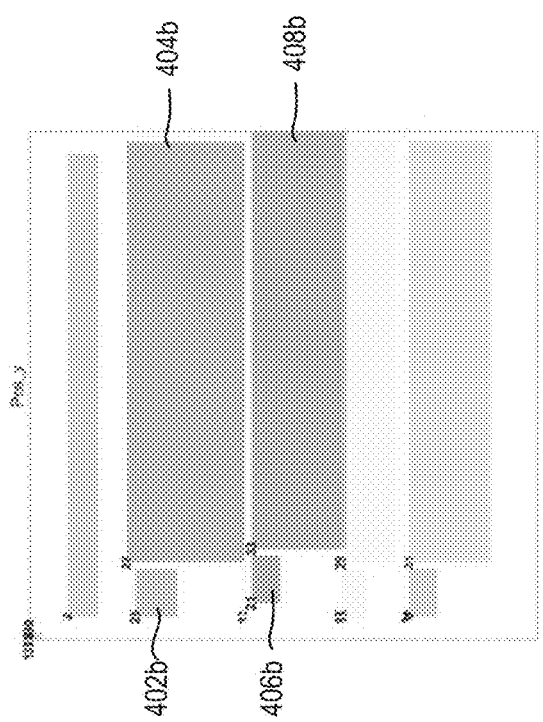

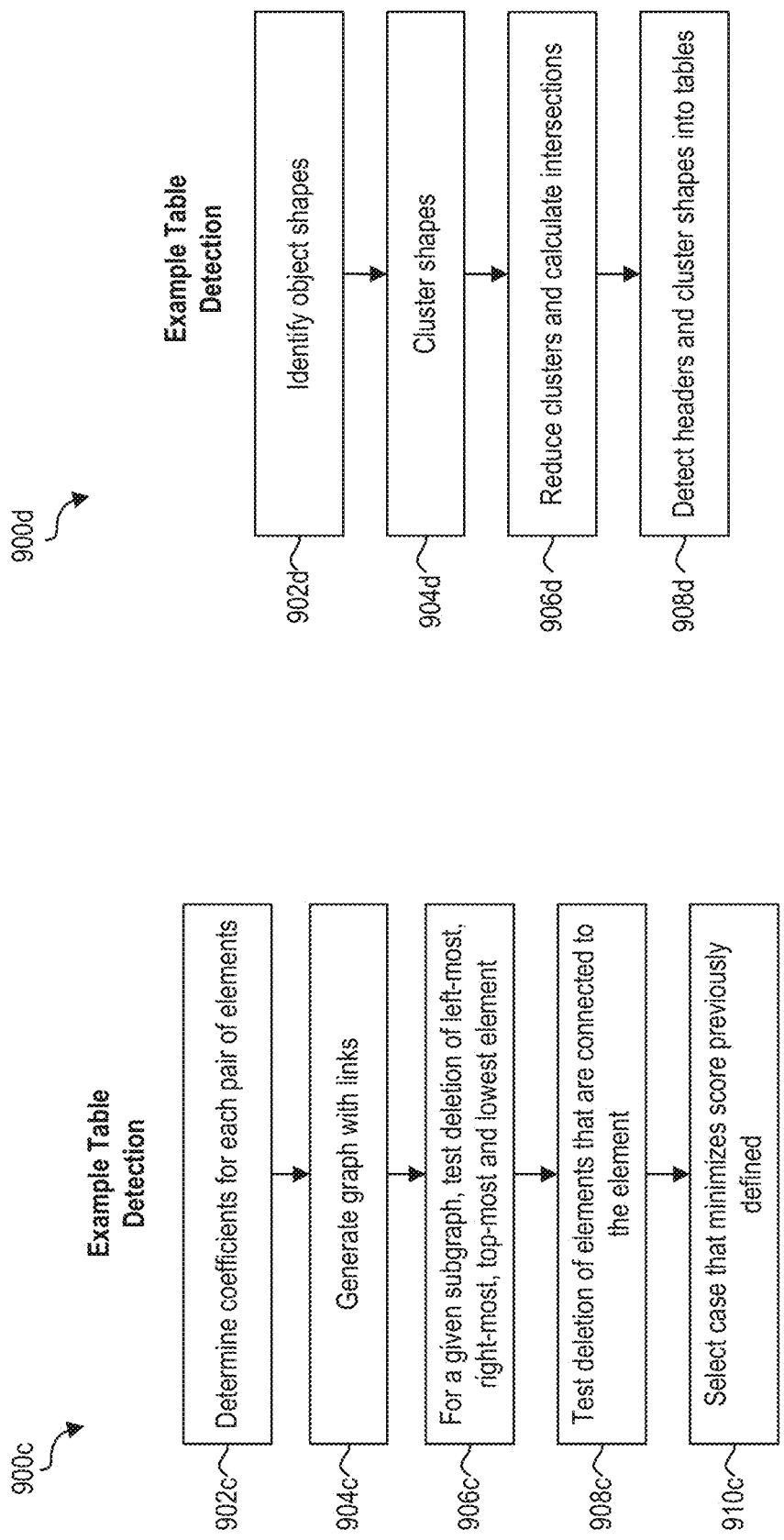

METHOD AND SYSTEM FOR AUTOMATIC FORMATTING OF PRESENTATION SLIDES

FIELD

The described embodiments relate to slide presentations, and in particular, to a method and system for automatic formatting of slide presentations.

INTRODUCTION

The following is not an admission that anything discussed below is part of the prior art or part of the common general knowledge of a person skilled in the art.

Digital slide presentations have become an important and pervasive tool in professional and business settings as a means of information sharing. Slide presentations typically include one or more slides, each slide displaying a set of textual, graphical or auditory information.

Authors of slide presentations often desire to present slide information in a particular manner. For example, this may involve arranging, aligning or sizing slide elements and/or slide structures to achieve a desired slide layout format. Slide elements can include titles, graphic, and the like, while slide structures can include tables or grids. In some examples, formatting is used to ensure the slides are visually appealing. In other examples, slide presentations are formatted to conform to certain organization-wide, or company-wide standards.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect of the teachings herein, there is provided a method for automatic formatting of presentation slides, comprising: receiving an input slide comprising one or more slide objects, wherein the input slide has a first slide layout configuration; determining metadata associated with the input slide, the determined metadata comprising property features of the one or more slide objects; analyzing the metadata to detect the one or more slide objects; determining one or more slide layout functional objectives; based on the one or more slide layout functional objectives, applying one or more transformations to the detected slide objects, wherein each transformation comprises modifying the metadata corresponding to the one or more detected slide objects to generate one or more corresponding transformed slide objects; and generating a transformed output slide, the transformed output slide comprising one or more transformed slide objects having a second slide layout configuration.

In at least one embodiment, the slide objects comprise one or more of a table structure, a grid structure or an outer element, and wherein the outer elements comprises one or more of a title, subtitle, sticker, tracker, footnote and source note.

In at least one embodiment, for each slide object, the corresponding metadata comprises one or more of a slide object identifier, geometric properties of the slide object, a slide object type, a placeholder, a slide object appearance order and textual properties associated with the slide object.

In at least one embodiment, analyzing the metadata to detect the one or more slide objects comprises applying one or more trained slide object detection models.

In at least one embodiment, the one or more objects comprise a grid structure, and classifying the grid structure comprises: analyzing the metadata to identify one or more property features of shape objects in the input slide; determining one or more derived features of the shape objects based on the one or more identified property features; detecting clusters of shapes with similar features or derived features; and matching clusters of similar size to detect the grid structure.

In at least one embodiment, detecting clusters of shapes comprises using a density-based spatial clustering with noise (DBSCAN) algorithm.

In at least one embodiment, the property features of an object comprise one or more of a position of the shape object or a size of the shape object, and the derived features comprise one or more of a ratio describing the size of the shape object and a surface area of the shape object.

In at least one embodiment, the one or more objects comprise a table structure, and classifying the table structure comprises: analyzing the metadata to identify one or more object shapes; clustering the object shapes into one or more rows and one or more columns, wherein the clustering is based on property features of the one or more shape objects; reducing each cluster to a median value; calculating intersections between clusters by projecting clusters two by two on an x-axis and y-axis; and formatting the clusters into a table.

In at least one embodiment, the clustering is performed using a k-means algorithm.

In at least one embodiment, the clustering is performed using a k-means algorithm coupled to an elbow method.

In at least one embodiment, the one or more slide object detection models receive inputs comprising property features and derived property features associated with one or more slide objects, and the derived property features are determined from the one or more property features associated with the one or more slide object.

In at least one embodiment, the trained models comprise random forest models.

In at least one embodiment, the one or more slide object detection models comprise one or more table detection models, and analyzing the metadata using the one or more table detection models comprises: applying pair-wise column and row prediction models; generating column and row graph representations; extracting column and row graph features from the column and row graph representations; applying a trained object-in-table detection prediction model to each slide object to generate a first prediction variable; applying an object-in table position model to each slide object to generate a second prediction variable; and generating an output classification vector comprising the first and second prediction variables.

In at least one embodiment, the method further comprises: applying a slide-level table prediction model to each slide object to generate a third prediction variable; and generating the output classification vector to further comprise the third prediction variable.

In at least one embodiment, the method further comprises: applying one or more trained screening models to generate one or more initial prediction variables; and inputting the one or more initial prediction variables as input features into the one or more table detections models.

In at least one embodiment, the method further comprises: determining, based on the one or more trained slide detection models, a slide object type; selecting one or more transformation models corresponding to that slide object type; and applying the one or more selected transformation models to the slide object.

In accordance with another broad aspect of the teachings herein, there is provided a system for automatic formatting of presentation slides, comprising: a communication network; a computer, the computer comprising an input interface for receiving an input slide and a communication interface for transmitting the input slide over the communication network; a server, the server comprising a server processor configured to: receive the input slide over the communication network, the input slide comprising one or more slide objects, wherein the input slide has a first slide layout configuration; determine metadata associated with the input slide, the determined metadata corresponding to property features of the one or more objects; analyze the metadata to detect the one or more slide objects; determine one or more slide layout functional objectives; based on the one or more slide layout functional objectives, apply one or more transformations to the detected slide objects, wherein each transformation comprises modifying the metadata corresponding to the one or more detected slide objects to generate one or more transformed slide objects; and generate a transformed output slide, the transformed output slide comprising one or more transformed slide objects having a second transformed slide layout configuration.

In at least one embodiment, the slide objects comprise one or more of a table structure, a grid structure or an outer element, and wherein the outer elements comprises one or more of a title, subtitle, sticker, tracker, footnote and source note.

In at least one embodiment, for each slide object, the corresponding metadata comprises one or more of a slide object identifier, geometric properties of the slide object, a slide object type, a placeholder, a slide object appearance order and textual properties associated with the slide object.

In at least one embodiment, the one or more objects comprise a grid structure, classifying the grid structure comprises the server processor being further configured to: analyze the metadata to identify one or more property features of shape objects in the input slide; determine one or more derived features of the shape objects based on the one or more identified property features; detect clusters of shapes with similar features or derived features; and match clusters of similar size to detect the grid structure.

In at least one embodiment, detecting clusters of shapes comprises using a density-based spatial clustering with noise (DBSCAN) algorithm.

In at least one embodiment, the property features of an object comprise one or more of a position of the shape object or a size of the shape object, and the derived features comprise one or more of a ratio describing the size of the shape object and a surface area of the shape object.

In at least one embodiment, the one or more objects comprise a table structure, and classifying the table structure comprises the server processor being further configured to: analyze the metadata to identify one or more object shapes; cluster the object shapes into one or more rows and one or more columns, wherein the clustering is based on property features of the one or more shape objects; reduce each cluster to a median value; calculate intersections between clusters by projecting clusters two by two on an x-axis and y-axis; and format the clusters into a table.

In at least one embodiment, the clustering is performed using a k-means algorithm.

In at least one embodiment, the clustering is performed using a k-means algorithm coupled to an elbow method.

In at least one embodiment, analyzing the metadata to detect the one or more slide objects comprises the server processor being further configured to: apply one or more trained slide object detection models.

In at least one embodiment, the one or more slide object detection models receive inputs comprising property features and derived property features associated with one or more slide objects, and the derived property features are determined from the one or more property features associated with the one or more slide object.

In at least one embodiment, the trained models comprise random forest models.

In at least one embodiment, the one or more slide object detection models comprise one or more table detection models, and analyzing the metadata using the one or more table detection models comprises the server processor being further configured to: apply pair-wise column and row prediction models; generate column and row graph representations; extract column and row graph features from the column and row graph representations; apply a trained object-in-table detection prediction model to each slide object to generate a first prediction variable; apply an object-in table position model to each slide object to generate a second prediction variable; and generate an output classification vector comprising the first and second prediction variables.

In at least one embodiment, the server processor is further configured to: apply a slide-level table prediction model to each slide object to generate a third prediction variable; and generate the output classification vector to further comprise the third prediction variable.

In at least one embodiment, the server processor is further configured to: apply one or more trained screening models to generate one or more initial prediction variables; and input the one or more initial prediction variables as input features into the one or more table detections models.

In at least one embodiment, the server processor is further configured to: determine, based on the one or more trained slide detection models, a slide object type; select one or more transformation models corresponding to that slide object type; and apply the one or more selected transformation models to the slide object.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 4A is a visualization of various detected objects in an example presentation slide;

FIG. 4B is a visualization of detected table rows in an example presentation slide;

FIG. 4C is a visualization of detected table columns in an example presentation slide;

FIG. 9C is an example embodiment of a method for extracting table structures and detecting tables rows and columns using an intersection based method;

FIG. 9D is an example embodiment of a method for extracting table structures and detecting table rows and columns using a combination of k-means and intersection based methods;

Figure 1:
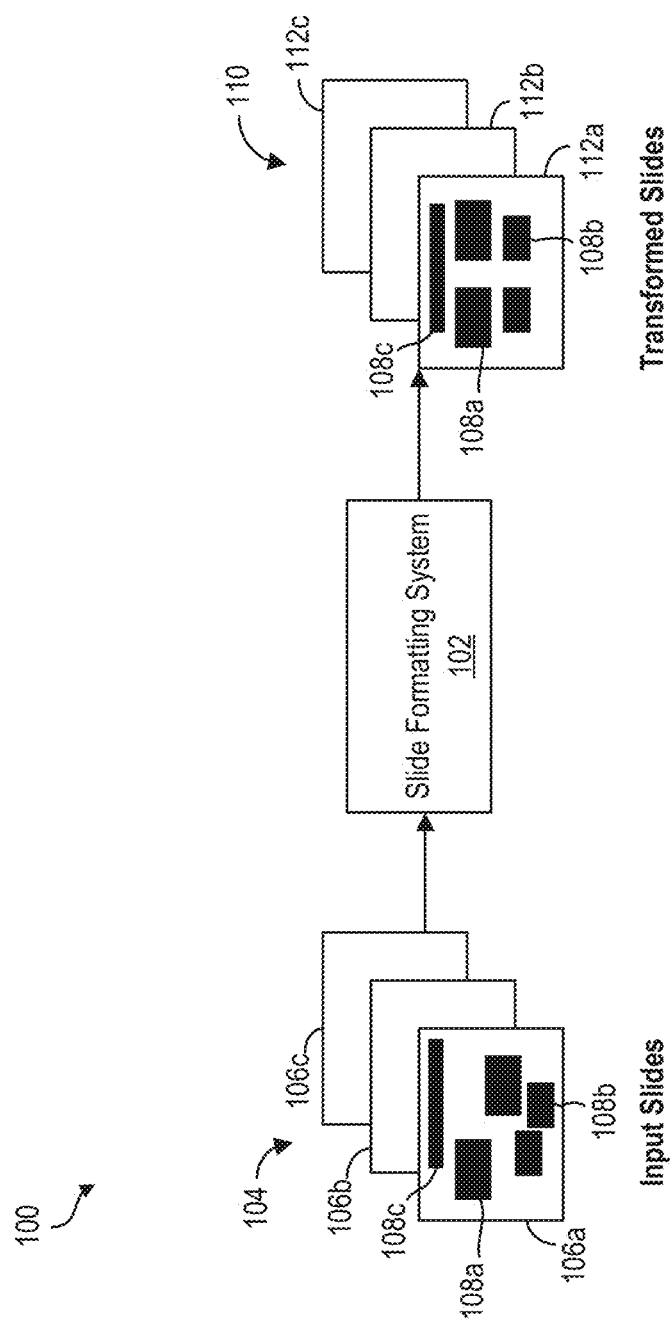
FIG. 1 is a visual illustration of an example process for automatic formatting of presentation slides.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity.

DESCRIPTION OF EXEMPLARY EMBODIMENTS

As discussed in the background, there is a desire for a software tool that enables automatic formatting, or re-formatting, of slide presentations. For example, the software tool can transform slide objects (e.g., elements and/or structures) to achieve desired slide layout configurations. Such a software tool may have a number of practical applications. For example, the software tool can achieve more visually appealing slide presentation layouts. The software tool may also allow companies, or organizations, to standardize their presentation slides in conformance with company-wide, or organization-wide presentation formatting standards.

Reference is briefly made to FIG. 1, which shows a visual illustration 100 of an example process for automatic formatting of slide presentations.

As shown, a slide formatting software system 102 is provided for automatic formatting and/or re-formatting of an input slide presentation 104. The software system 102 can be hosted on a remote server and/or a user computer terminal.

Input slide presentation 104 may include one or more digital slides 106a-106c. Each input digital slide 106 can include one or more slide objects 108a-108c. A slide object 108 may broadly comprise various slide elements, as well as slide structures. Examples of slide elements include visual or textual elements, such as titles, subtitles, stickers, trackers, footnotes, sources, etc. Examples of slide structures include grids or tables.

In some examples, slide objects 108—located in the input slides 106—may be unformatted, or otherwise improperly formatted. For example, a slide object 108 may be spatially mispositioned or misaligned, relative to other slide objects. In other examples, slide objects 108 may be improperly sized, or may not have desirable size ratio proportions.

In accordance with embodiments described herein, the slide formatting system 102 may receive the input slides 106 having an initial slide layout configuration. The slide formatting system 102 may then automatically detect, and apply one or more transformations to the slide objects 108 in each slide. In turn, a transformed slide presentation 110 is generated with transformed slides 112a-112c. The transformed slides have a transformed slide layout configuration, and include transformed slide objects 108a-108c.

Different transformations can be applied by the slide formatting system 102. By way of non-limiting examples, these include geometric transformations, such as re-positioning slide objects, re-aligning slide objects and/or re-sizing slide objects. With respect to textual slide elements, the transformations can also include various textual property transformations, such as transforming the text font and/or size.

In some examples, the slide formatting system 102 may generate the transformed slides 110 in real time or near real time. For example, once the input slides 104 are received by the system 102—the output, transformed slides 110 can be generated instantaneously or near-instantaneously.

More broadly, to generate the transformed slide presentation 110—the slide formatting system 102 may perform one or more functions, including: (a) initially, automatically detecting the various slides objects 108 in each input slide, and (b) subsequently, applying the one or more transformations to each of the detected slide objects, to generate the transformed slide objects.

In at least one example, transformations applied to the detected slide objects are applied in accordance with pre-defined functional objectives. The pre-defined functional objectives define the desired transformations to be applied to the slide objects to generate the target transformed slide layout. For instance, a functional objective may require positioning the title—on any given slide—at the top of the slide, and further horizontally centered.

Different functional objectives may be defined for different slide object types. In other words, different objectives may be defined for titles, subtitles, stickers, trackers, or more complex structures, such as tables or grids. Further, different objectives may also be defined for different slide types. For instance, different objectives can be defined for a title slide, as contrasted to a visual chart slide, or the like.

In some examples, the detection and transformation are applied at the metadata level. For example, slide formatting system 102 can extract, or receive, slide metadata associated with an input slide 106. Different slide objects are then identified in the metadata, and the relevant metadata is modified to effect a corresponding transformation.

Figure 2:
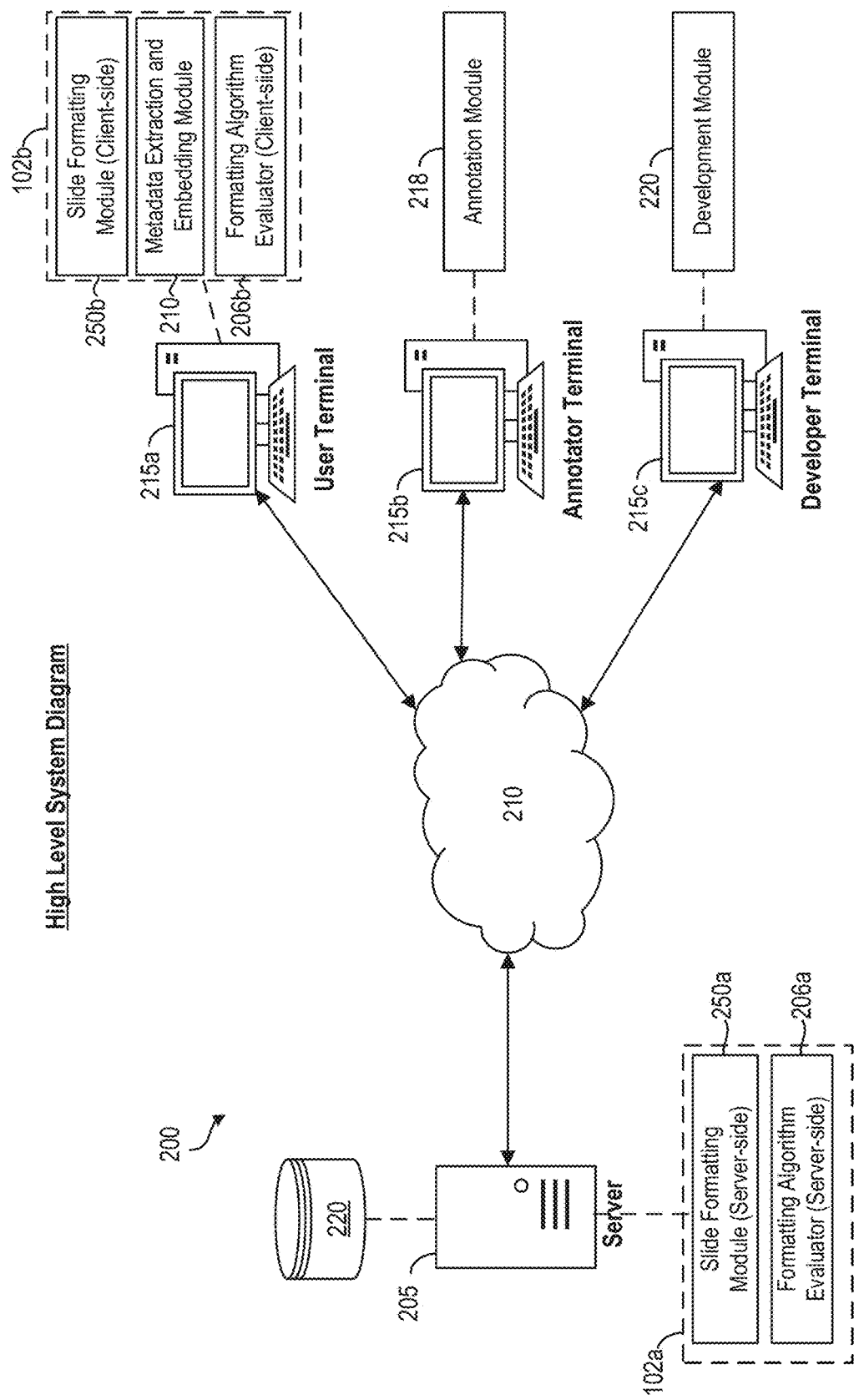
FIG. 2 is a block diagram of an example system for use in automatic formatting of presentation slides.

Reference is now made to FIG. 2, which shows an example system 200 for automatic formatting of slide presentations. System 200 provides an example environment in which the methods and processes described herein may operate.

As shown, system 200 generally includes a server 205 in communication, via a network 210, with one or more computer terminals 215 as well as a database storage 220.

Server 205 is a computer server that is connected to network 210. As explained in greater detail with respect to FIG. 15A, server 205 has a server processor, volatile and non-volatile memory, at least one network communication interface, as well as various other input/output devices. As with all devices shown in the system 200, there may be multiple servers 205, although not all are shown.

It will be understood that the server 205 need not be a dedicated physical computer. For example, the various logical components that are shown as being provided on server 205 may be hosted by a third party "cloud" hosting service such as Amazon™ Web Services™ Elastic Compute Cloud (Amazon EC2).

In at least some examples, the slide formatting system 102 is stored on the server's memory, and executable by the server's processor. In other examples, the slide formatting system 102 is distributed between the server 205, and one or more user terminals 215.

The server-side, slide formatting system 102 can include various software modules. For example, these include a server-side, slide formatting module 250a, and a formatting algorithm evaluator 250b.

Slide formatting module 250a may receive input slides 104 and generate the transformed output slides 110. In some examples, the slide formatting module 250a does not receive the input slides directly, but receives metadata associated with the input slides 104. For example, the slide metadata can be received from the client-side module 250b. For instance, the client-side module 250b may interact with a metadata extraction module 210, which extracts slide metadata. In some examples, the slide metadata is extracted as a JSON file. The slide metadata is then transmitted to the formatting module 250a, on server 205. To this end, the slide metadata can include metadata associated with various slide objects included in a slide (also referred to herein as "slide object metadata").

Server-side formatting module 250a can receive the slide metadata, and can operate to: (i) detect metadata associated with different slide objects (i.e., detect the "slide object metadata"), and (ii) modify, or transform the slide object metadata.

The output of the slide formatting module 250a is then transformed slide metadata (e.g., a transformed JSON file). The transformed slide metadata, itself, includes various transformed slide object metadata.

The transformed slide metadata is then transmitted back to the user terminal 215a, which re-generates the output slides 112 based on the transformed slide metadata. In other examples, the slide formatting module 250a may also automatically re-generate the output slides 112, and transmit the output slide back to the user terminal 215a.

In at least one example, the slide formatting module 250a can host one or more trained machine learning models. The trained machine learning models can detect various slide objects in the extracted slide metadata, and can apply transformations to the slide object metadata to generate transformed slide object metadata. Slide formatting module 250a can also, more generally, host various rule-based algorithmic models, also used for detecting and transforming slide objects.

In other example cases, the server 205 may not necessarily host a slide formatting module 250b, and only the user terminal 215a may host the slide formatting module 250a.

Formatting algorithm evaluator 250b determines and evaluates the functionality of the slide formatting module 250b. For example, once the slide formatting module has generated output modified slides, a user may submit feedback on the output modified slides (i.e., a rating). For example, a user terminal 215a may transmit a feedback signal rating the quality of the output slides. In some examples, the formatting evaluator 250b is only optionally provided.

In at least some examples, the feedback can also include an indication of which functional objectives were not met in generating the transformed output slide. This feedback may be used for enhancing the slide formatting module's algorithm. For example, the feedback can be used for further training, or re-training of machine learning models hosted by the slide formatting module 250a. In some embodiments, a client-side formatting algorithm evaluator 206b is also provided, at the user terminal 215a, in conjunction with the server-side evaluator 206a.

In some examples, the server 205 may also include software modules which can be used to verify that any software installed located on a user terminal 215a (e.g., client-side formatting module 216) is properly licensed for use.

Computer terminal(s) 215a-215c generally refer to desktop or laptop computers, but may also refer to smartphones, tablet computers, as well as a wide variety of "smart" devices capable of data communication. As also provided in greater detail herein, with respect to FIG. 15B—like server 205, each computer 215 may include a processor, a volatile and non-volatile memory, at least one network interface, and input/output devices. Computer(s) 215 may be portable, and may at times be connected to network 210 or a portion thereof.

In some examples the computer terminals 215 include one or more user terminal(s) 215a, annotator terminals 215b and/or developer terminal(s) 215c.

User terminal 215a may be associated with an end user, and provides an interface to input a slide presentation (e.g., slide presentation 104). The interface can allow formatting of the slide presentation by one of the formatting modules 250a, 250b. The user may then view the output transformed slide presentation 110 on a display of the computer terminal 215a.

In some examples, the client-side formatting module 250b is provided as a front-end extension of a slide presentation generating program (e.g., PowerPoint®). The user may select the extension to transform the slide layout, or otherwise re-format an input slide presentation.

As stated previously, the transformed slides can be generated in various manners. That is, the transformed slides can be generated through various interactions between the user terminal 215a and the server 205.

For instance, in at least one example—upon selecting the extension at the user terminal 215a, the client-side slide formatting module 250*b* may automatically generate the output transformed slides. In other examples, the client-side slide formatting module 250*b* may transmit the input slides to the server-side formatting module 250*a*, which may itself re-format the slides. The server-side module 250*a* may then transmit the modified slides back to the user terminal 215*a*.

In still other examples, the client-side formatting module 250*b* may extract metadata from the input slides, and may transmit only the metadata to the server-side formatting module 250*a*.

For example, the client-side slide formatting module 250*b* may receive the input slides, extract an XML file, and may further process the XML file to compute slide object metadata. The computed metadata is then transmitted to the server-side formatting module 250*a* for modification.

In still yet other examples, rather than extracting an XML file—the client-side, formatting module 250*b* may directly extract metadata via a component object model (COM). The metadata is then transmitted to the server 205 for further processing by the server-side, formatting module 250*a*. For example, the server-side formatting module 250*a* generates transformed metadata. Transformed metadata is then transmitted back to the user terminal 215*a* to be converted back into a transformed slide presentation using the COM. The metadata extraction and embedding module 210 can be used to extract metadata, and embed back transformed metadata into slide presentations, at the user terminal side.

In some cases, as stated previously, the user terminal 215*a* may also host a client-side, formatting algorithm evaluator 206*b*. The formatting evaluator 206*b* may provide a complementary, client-side interface to formatting evaluator 206*a* on server 205. The client-side, formatting evaluator 206*b* can provide an interface for the user to provide feedback on the output transformed slides (e.g., a rating). The feedback is transmitted to the server-side formatting algorithm evaluator 206*a* for further analysis.

Annotator terminal 215*b* is a computed operated, for example, by an experienced user annotator. The annotator terminal 215*b* can configure the functionality of the slide formatting modules 250.

In some examples, the annotator terminal 215*b* may host an annotation module 218. Annotation module 218 may allow a back-end annotator to retrieve slide metadata that is stored, for example, on a server memory or data storage 220. The slide metadata can include metadata associated with training slides. The annotation module 218 may allow the user annotator to define and annotate various slide objects defined in the retrieved slide metadata (e.g., annotate the presence of tables, table rows, table headers, etc.). In some examples, this annotation is used to generate training data, which is fed into one or more machine learning models for training. For example, the annotated metadata can be used to train machine learning models to automatically identify different slide objects from slide metadata.

More broadly, the annotator module 218 may also allow the annotator to record and define specific functional objectives in relation to different slide objects, or slide types. For instance, this can include defining desired alignments for certain slide objects, based on the metadata. In these examples, the output, of the annotation module 218, may include an identifier assigned to each slide object. The identifier can associate the slide object's metadata with specific functional objectives. This data can be saved in the server memory, or database 220, and can configure the formatting module's 250 algorithm.

Developer terminal 215*c* may host a development module 220. Development module 220 can be used by a program developer to program various features of the slide formatting module.

Data storage 220 may include volatile memory, non-volatile memory, storage elements, or any combination thereof. In various cases, the data storage 220 may store various training data for training machine learning algorithms that comprise the slide formatting system 102. The training data, for example, may include various slide presentations (i.e., PowerPoint® presentations). In some cases, the slide presentations may have been processed and transformed into JSON files (e.g., a JSON file which includes metadata extracted from each slide presentation).

In at least some examples, the data storage 220 may be a non-relational database, such as a key-value database, NoSQL database, a graph database, or the like. The use of non-relational databases may allow for storing large volumes of data without a data structure, which may be important as the information extracted from slide presentations (e.g., forming a training dataset) may vary greatly from one slide to another and the training data may evolve over time.

While shown separately from the server 205 for ease of description, the data storage 220 may be included inside the server 205. For example the data storage 220 may represent a memory component of the server 205. As well, similar to the server 205, the data storage 220 may be a "cloud" memory storage.

Figure 3A:
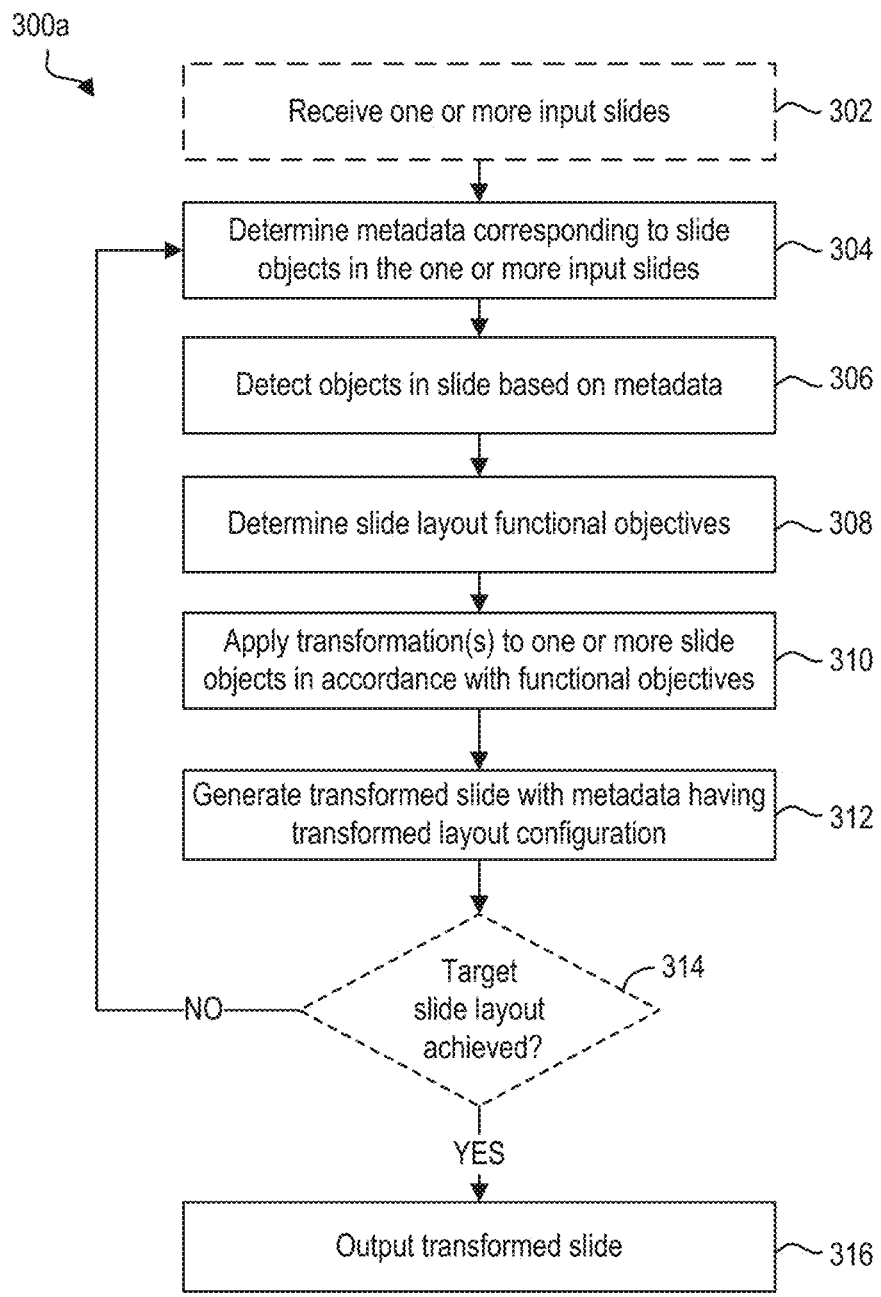
FIG. 3A is an example method for automatic formatting of presentation slides.
Figure 3B:
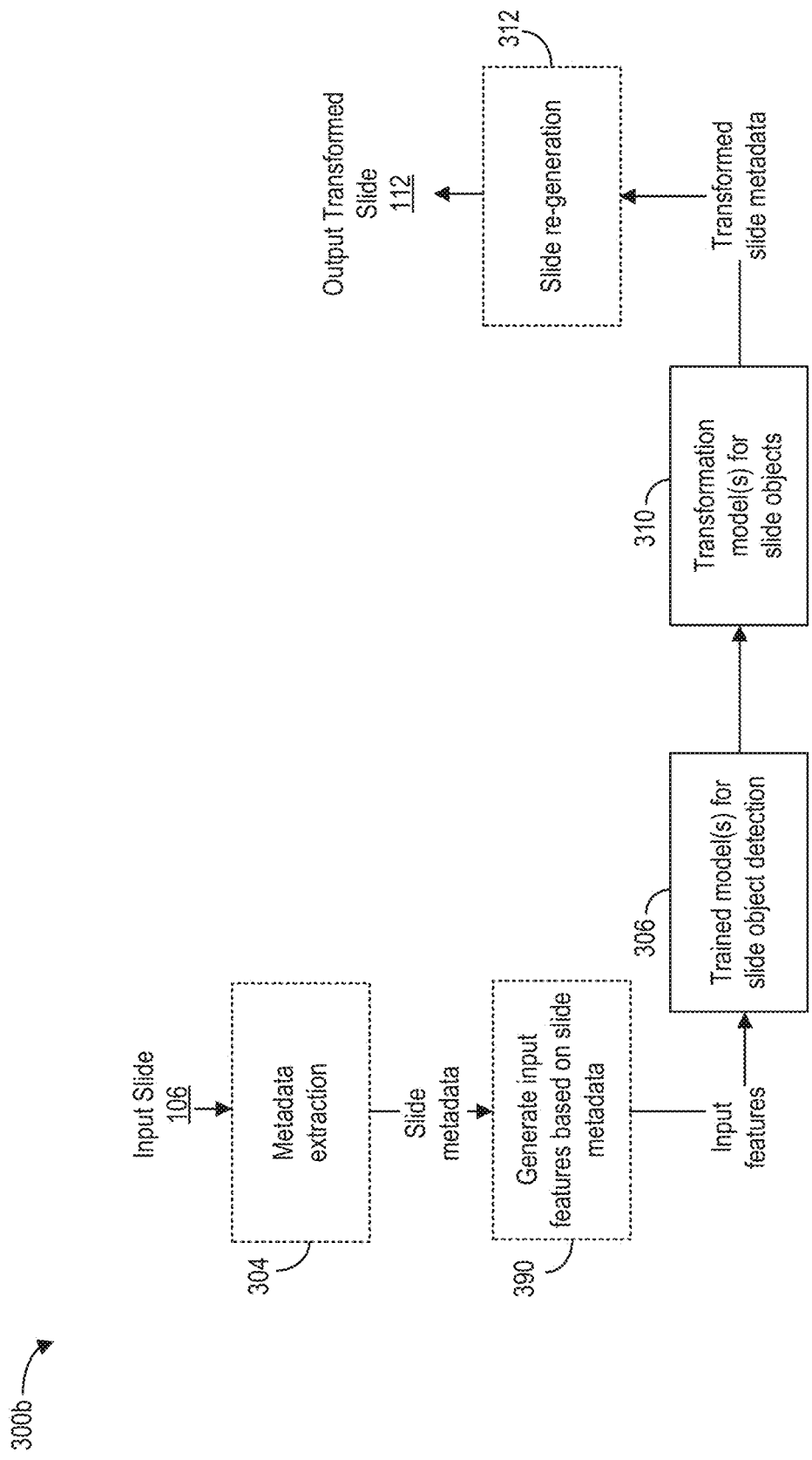
FIG. 3B is another example method for automatic formatting of presentation slides.

Reference is now made to FIGS. 3A and 3B, which shows example methods 300*a* and 300*b* for automatic formatting of presentation slides. Methods 300*a*, 300*b* may be performed, for example, by the server processor 205 and/or computer processor 215 executing the respective slide formatting modules 250.

At 302, one or more inputs slides are received. In some examples, the slides are retrieved from the data storage 220. In other examples, a user may input a slide presentation into the slide formatting module 250*b*, on user terminal 215*a*. This can be done via a graphical user interface (GUI) associated with the slide formatting module 250*b*, or by clicking on add-on extension associated with module 250*b*. The input slide presentation can be anonymized to remove any private or client-sensitive material.

At 304, slide metadata is determined from the input slides. The slide metadata can include metadata associated with different slide objects, located in each input slide (i.e., slide object metadata).

In some examples, the slide metadata can include a list of individual objects on each slide, and all corresponding property features of that slide object. For instance, for any given object on a slide, the property features can include: (i) an identifier of the shape of the object; (ii) geometric properties of the object, which can include the position of the object on the slide, as well as its size and dimensions. In some cases, the position of the object is expressed by the x-axis and y-axis position co-ordinates of the upper left corner of the object (e.g., 'Pos_x' and '*Pos_y'). Further, the size of the object can be expressed by the x-axis height and y-axis length of the object (e.g., 'Size_x' and 'Size_y'); (iii) the type of object shape (e.g., text, color rectangle, arrow, etc.); (iv) the placeholder (e.g., name assigned to object shape); (v) a shape appearance order (e.g., the z-index, expressing overlap between objects); and/or (vi) for textual elements, textual properties (i.e., number of characters, font, size, bold/italics, etc.).

Slide metadata can be determined in various manners. For example, the metadata can be extracted from the input slides. For instance, the metadata extraction module 210 can use a component object model (COM) to access the underlying slide metadata. The slide metadata can include metadata for each slide object in that slide. In some cases, the metadata is extracted to generate a JSON metadata file.

At 306, the metadata associated with each slide is analyzed to detect, and classify the slide objects located in the respective slide.

FIG. 4A illustrates an example visualization 400*a* of outer elements 402*a* (e.g., a title), as well as a table structure 404*a*, 406*a* that may be detected in a slide, at act 306. FIGS. 4B and 4C show further visualizations 400*b*, 400*c* of table detection, including detecting various table rows (402*b*-408*b* in FIG. 4B), as well as table columns (402*c*-404*c* in FIG. 4B).

In some examples, the slide formatting system 102 classifies objects in the extracted metadata using one or more trained machine learning models. The trained machine learning models analyze slide object property features to classify objects appropriately. Slide object property features correspond to the information directly included in the slide object's corresponding metadata. In some examples, the trained machine learning models can also analyze derived property features. Derived property features are features which are determined from the slide object's property features. In at least one example, the trained machine learning models are fed input features generated based on the slide object metadata (see e.g., 390 in FIG. 3B). The input features include a combination of property features and/or derived property features, for different slide objects.

In some examples, each machine learning model, used for detection at 306, is trained on a sample of over 1,000 slides (e.g., 3,000-4,000 slides). The training set includes an aggregate of over 200 different types of slide objects, that include various slide object elements and structures. Each training slide is annotated, and tagged beforehand with each slide object on an object-by-object basis. Accordingly, each training slide is associated with one or more labelled slide objects. In some cases, training data is also initially cleaned, pre-processed, quality checked, such as to exclude noisy data.

In various example cases, described below, random forest models are trained and used for machine learning slide object detection. In each of these examples, the random forest models can be trained using the following hyperparameters: (i) number of trees in the forest: between 100 and 300; (ii) depth of trees: between 5 and 15; (iii) maximum number of features used at each node: lower than sqrt(total number of features); (iv) minimum leaf sample size: between 10 and 20; and (v) splitting criteria: Gini or Entropy. Once these hyperparameters are set, the random forest model is trained by CART (classification and regression trees) fitting for each tree in the forest, and then bagging (e.g., bootstrap aggregating) for ensemble prediction.

With respect to the hyperparameters, for each random forest model trained, there may be eventually only one value for each hyperparameter. Accordingly, the ranges are tested while tuning the models, eventually selecting the set of values that provides the best performance level, e.g., measured through ROC (receiver operating characteristic curves) and AUC (area under the curve).

At 308, one or more slide layout functional objectives are determined. The objectives may dictate desired transformations to apply to detected slide objects to achieve desired slide layout configurations. In some examples, the functional objectives are previously defined by an annotator, operating the annotator terminal 215*b*.

Functional objectives may be of several types, and can include, (i) common objectives—objects defined uniformly for all slides in a presentation, e.g., all objects should be formatted inside the slide area, and textual objects should not overlap; (ii) user-level objectives—objects defined uniquely based on user specified preferences, e.g., the font size of a table should be "X" pixels greater than table content; and (iii) presentation-level objectives defined in the template slide, e.g., organization-wide template based objectives.

In other examples, the functional objectives can be defined ahead of time, e.g., prior to acts 302-308.

At 310, one or more transformations are applied to detected slide objects to give effect to the functional objectives. The effect of applying these transformations is to generate transformed slide object metadata (i.e., transformed slide metadata).

For example, an objective may require transforming the position and size of a slide object. Accordingly, transformations are applied to that slide object to generate a transformed slide object, having the desired size and position. When a transformation is applied, the metadata corresponding to that slide object is modified to achieve the desired transformation.

At 312, a modified slide is generated having a transformed layout configuration based on the modified slide metadata. For example, this may involve embedding the transformed slide metadata into the COM using the data embedder module 210.

At 314, in some examples, it is determined whether the desired slide layout is achieved. That is, an algorithm can estimate if the slide is in a stable state where no further transformation to slide object metadata are required.

In some examples, a number of iterations of transformations are required to achieve a desired slide layout. For example, this may be the case where adjusting one slide object requires iteratively adjusting surrounding slide objects.

If the slide is not in a stable state, then the method 300*a* may return to act 304 to re-iterate until the desired slide layout is achieved. In subsequent iterations of method 300*a*, it may be necessary to re-detect the adjusted slide objects (act 306), and/or re-determine the slide functional objectives in view of newly adjusted objects (act 308).

In various cases, methods 300*a*, 300*b* are iterated (e.g., acts 310 and 312, and in some cases, acts 308 and 310) until a state of optimal stability is reached. In some cases, 40 to 200 iterations of transformations may be applied to slide objects to reach a state of optimal stability.

At 316, once the desired slide layout configuration is achieved—e.g., a state of optimal stability is attained—a transformed slide is output having a transformed layout configuration.

As explained previously, there are a number of different types of slide objects that can be detected or classified (act 306 of FIG. 3), and further transformed (act 310 of FIG. 3). By way of way of non-limiting examples, these include: (a) outer elements (e.g., titles, subtitles, stickers, trackers, footnotes, sources or other uncategorized elements); (b) grids; (c) legends; and/or (d) tables. The detection and transformation of these slide objects is now discussed in greater detail herein.

(a) Detection and Transformation of Outer Element Slide Objects

Outer elements can include titles, subtitles, stickers, trackers, footnotes sources, as well as other uncategorized elements. Each of these elements may be separately detected and transformed.

It has been appreciated that trackers and footnotes do not typically present detection challenges (act 306 of FIG. 3), as they are generally similar on all slides, and are sufficiently unique structures to avoid confusion with other structures.

Titles have slightly different detection challenges, depending on the particular nature of the slide. For example, different titles on slides can include classic titles on a slide, first page titles, as well as titles on a page that is divided into two columns. In each of slide layout, the title is located at different coordinates based on the slide layout. Accordingly, there is a challenge in generating a generalized method that may detect different types of titles on different slides, based on the corresponding metadata.

Similar challenges are also encountered with respect to detecting subtitles. For example, the position of subtitle may vary between slides. A further challenge with subtitle detection is that the body text of a slide may be confused with a subtitle based on its metadata properties.

Other challenges are also presented in detection of stickers. For example, there are a wide variety of stickers that vary as between their position or size. Stickers that are placed at, or outside, the slide may also have common characteristics with other types of shapes.

Figure 5:
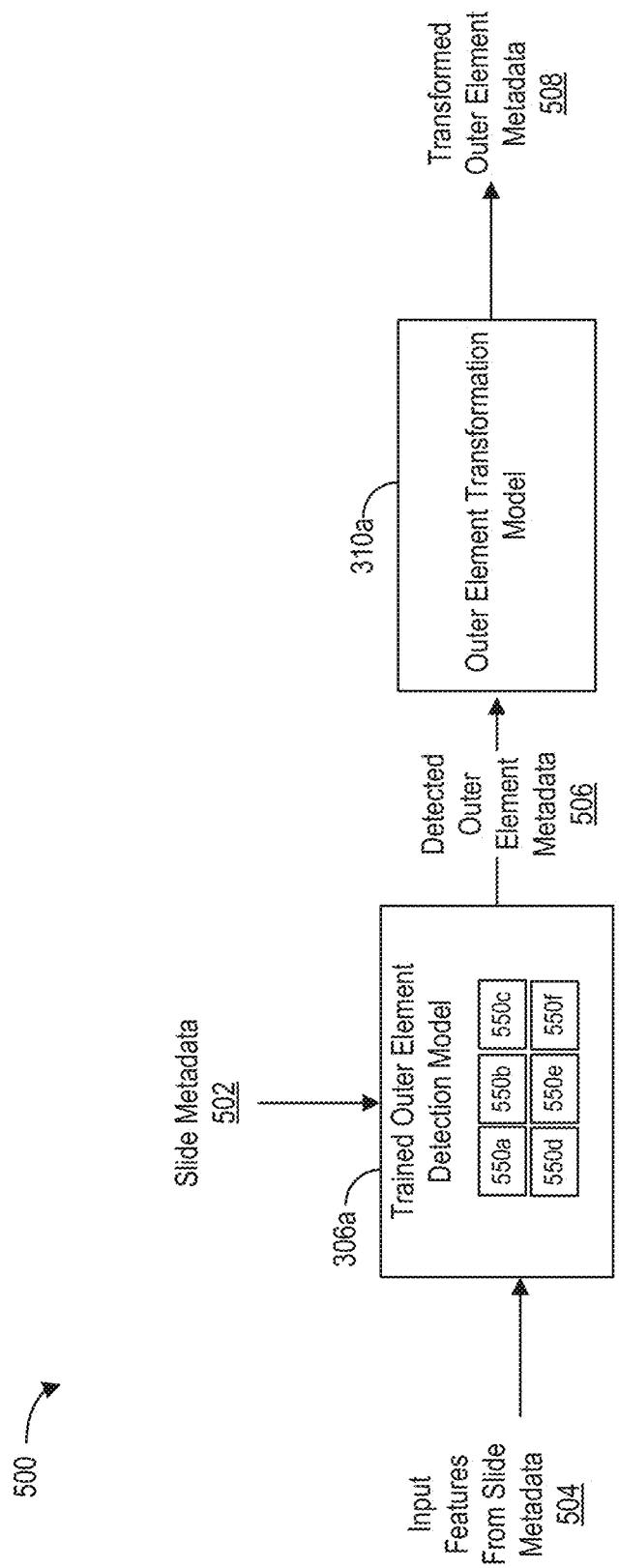
FIG. 5 is an example method for detecting and transforming outer slide elements in presentation slides.

Reference is now made to FIG. 5, which shows an example method 500 for detection and transformation of outer element slide objects. Method 500 at least partially relies on the use of trained machine learning models.

As shown, method 500 generally includes two parts: (i) detection of outer elements in a slide using a trained outer element detection model(s) 306a; and (ii) applying one or more transformation models to the detected outer elements 310. In this manner, method 500 is considered an example application of method 300b, in FIG. 3B.

The outer element detection model(s) 306a can, itself, include one or more trained machine learning models. The trained machine learning models can receive input features 504, corresponding to different slide objects. Input features can include slide object metadata 502. For example, input features can include property features of slide objects, as included in the metadata 502. Input features can also include derived property features, which are determined from the slide object's property features.

Different trained detection models can be provided for detecting different types of outer slide elements. For example, the models can include: (i) a title detection model 550a, (ii) a subtitle detection model 550b, (iii) a sticker detection model 550c, (iv) a tracker detection model 550d, (v) a footnote detection model 550e, and/or (vi) a source detection model 550f.

Different detection models may use, or rely on the same or different input features 504. For example, the detection models can receive various geometric data including positional data for a slide object (e.g., x, y) and/or dimensional data (e.g., width, and height). Models can also receive textual font data (e.g., font size, font style—bold, italic, bold), and character count.

In at least one example, each of the detection models comprises a trained random forest model. The sticker detection model 550c can use logistic regression.

The output of the detection models can be an indication that input slide object metadata 502 corresponds to a specific type of outer element. Depending on which model is used, the output also specifies the type of outer element, e.g., a title, subtitle, sticker, tracker, footnote or source.

Once the detection is completed using the detection models 306a, the output is fed into the outer element transformation model 310a. The transformation model 310a receives the slide object metadata that is identified as being a type of outer element. The transformation model 310a then operates to modify the corresponding slide object metadata to generate transformed slide object metadata 508, in accordance with the pre-defined slide layout objectives. For example, this can involve modifying property features of the slide object data corresponding to a position within the slide, or the font size.

In some examples, the transformation models 310a are rule-based models that apply pre-defined transformation rules to detected slide objects. For example, the rules can be based on pre-defined functional objectives defining the placement and visual appearance of titles, subtitles, stickers, footnotes and/or sources.

In at least one example, the transformation model 310a applied is based, and varies in view of the type of outer element that is detected at 306a. For example, different transformations are applied to different types of outer elements. Therefore, an intermediate act before 310a can involve determining the appropriate transformation model 310a to apply to a slide object, based on the determination of detection models 306a.

(b) Detection and Transformation of Grid Structures

Grids are complex structures in a slide, which can pose challenges in their detection. While a grid may be defined as a repetition in space of a set of elements, beyond this, the definition can be ambiguous. For example, grids may share a number of features with tables, and therefore may not be easily distinguished from tables. A grid may also include a legend, which occurs as a separate structure. In some cases, a list may also be included in the definition of a grid.

Owing to the vague definition of grids, challenges are posed in distinguishing grids and tables, from legends and other structures. The erroneous detection of slide objects as grids may cause a mistaken, or inappropriate transformation being applied to that object—or otherwise, transforming the slide object twice if a specific algorithm is already previously applied. The detection of grids is further complicated where the input slides are obfuscated (e.g., for privacy reasons) and/or labelling annotations are missing.

Figure 6A:
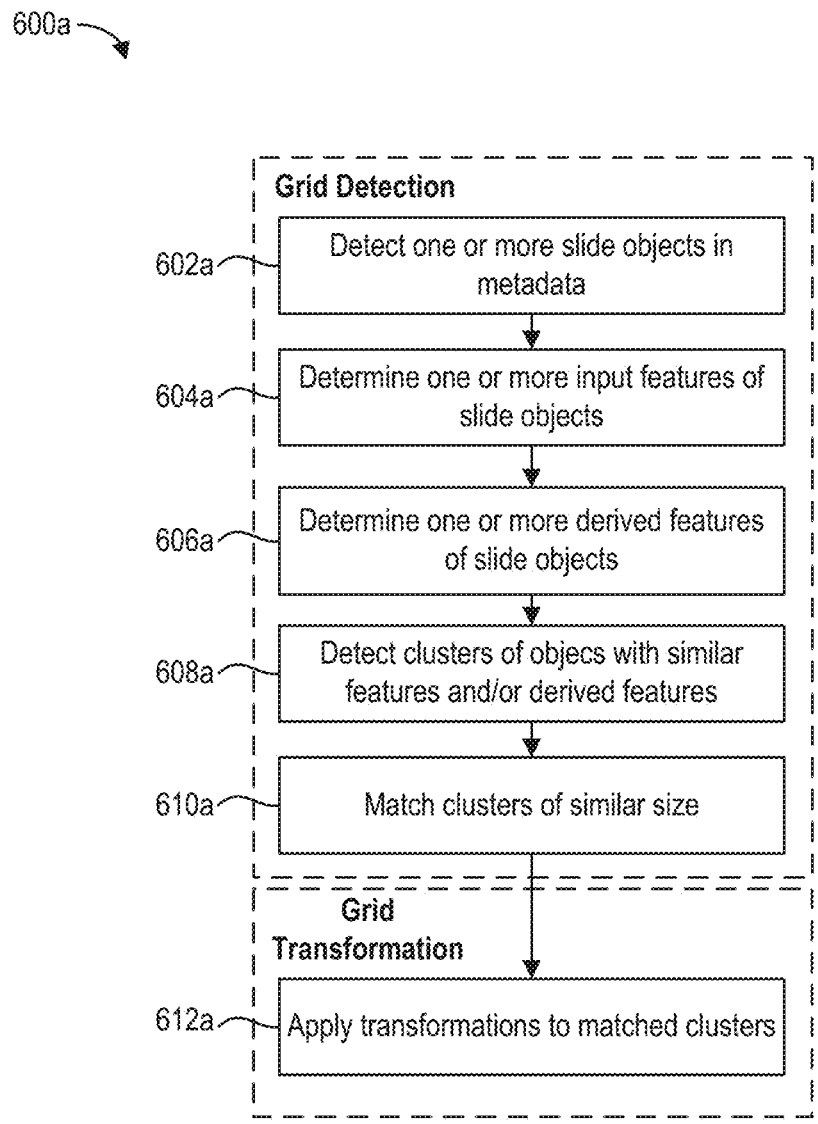
FIG. 6A is an example method for detecting and transforming grid structures in presentation slides.

Reference is now made to FIG. 6A, which shows an example method 600a for detecting and transforming grid structures in slides. Method 600a generally correspond to acts 306 and 310 in methods 300a.

Method 600a is based on the recognition that grids are composed of a set of grid elements, themselves composed of shapes. Accordingly, grids may be detected by detecting similar slide objects that repeat in a slide.

At 602a, one or more slide objects are identified in an input slide based on the received metadata (i.e., act 304 in FIG. 3).

At 604a, for each identified slide object, one or more property features of that slide object are determined from the corresponding metadata. For example, this can include determining geometric property features, including: (i) positional data for the slide object (e.g., x-position (Pos_x) and y-position (Pos_y); and/or (ii) size data of the slide object (e.g., along the x-axis (Size_x) and along the y-axis (Size_y)).

At 606a, one or more derived property features may be further determined for each identified slide object. For example, this can correspond to determining a ratio of the size of the identified slide (i.e., Size_x/Size_y). Another example derived feature is the surface area of the slide object (i.e., Size_x*Size_y).

At 608a, based on the property features identified for each slide object, as well as the corresponding derived features—one or more shape clusters are detected. The clusters may correspond to groups of similar slide objects. In some examples, each cluster corresponds to a separate grid element.

In at least one example, a density-based spatial clustering of applications with noise (DBSCAN) method is used to detect each cluster of slide objects.

At 610a, the grid is reformatted by matching clusters of similar size. For example, if the function that associates a shape of a first cluster with its nearest neighbor of a second cluster is bijection, then the two clusters are matched. If the paired slide objects are located in the same way relative to each other on all pairs, both clusters are considered as being are part of the same grid.

Figures 7A, 7B:
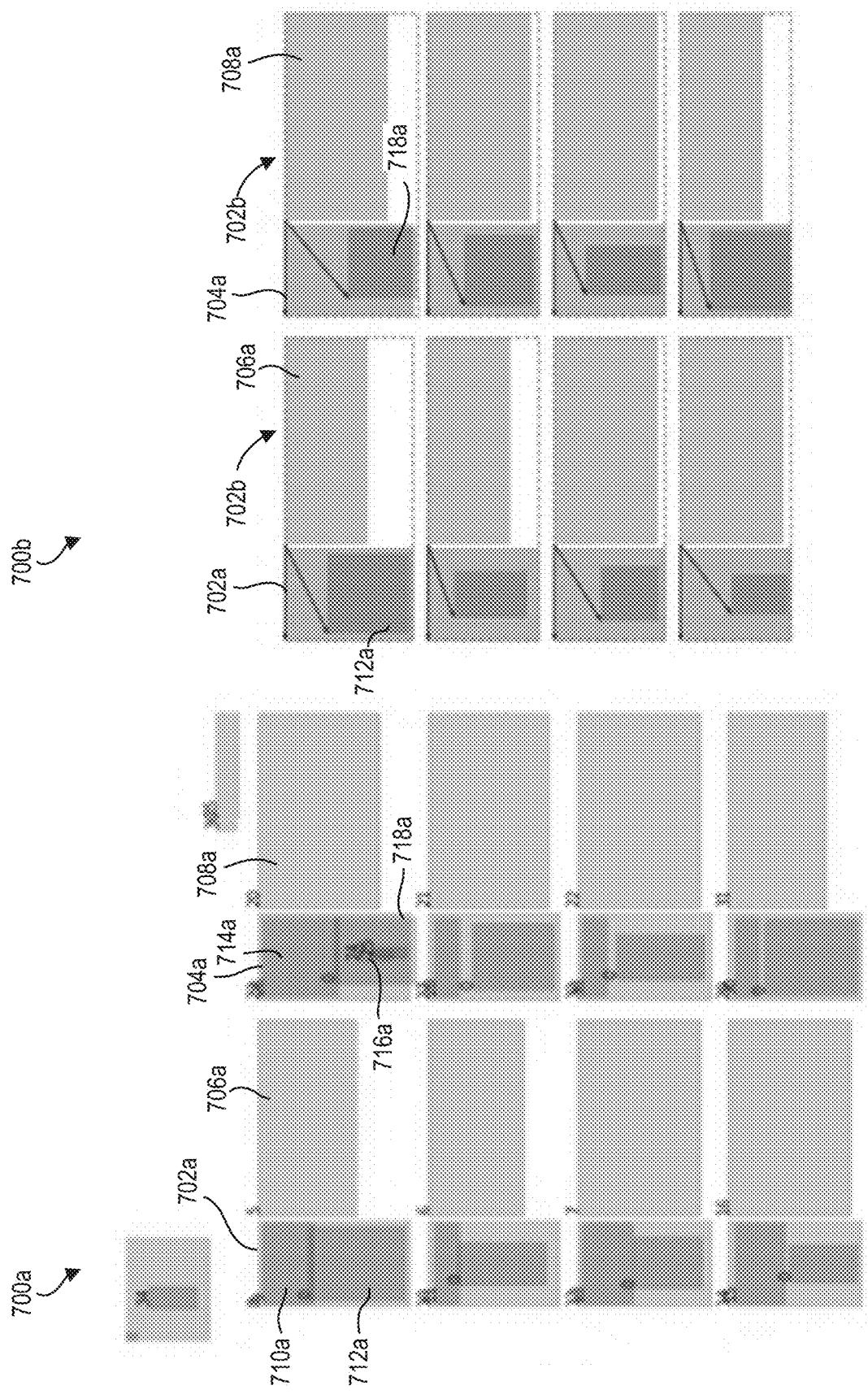
FIG. 7A is an example visualization of an undetected grid structure in an example presentation slide.
FIG. 7B is an example visualization of a partially detected grid structure in an example presentation slide.

Referring briefly to FIGS. 7A and 7B, which show visualizations of an undetected grid structure 700a, and a partially detected grid structure 700b.

The undetected grid 700a includes a plurality of slide objects 702a-718a. In the partially detected grid structure, clusters of related slide objects, corresponding to different grid elements, are detected. For example, a grid element 702b may include slide objects 702a and 706a, while grid element 702b may include slide objects 704a and 708a.

Referring back to FIG. 6A, at 612a, one or more transformation are applied to the clusters of slide objects detected as grid elements. Two example transformations may include, (a) alignment of grid elements with each other; and (b) standardization of grid element. The transformations may be applied to a metadata file associated with the slide (e.g., a JSON python file).

In the example of aligning grid elements, this may be achieved by generating a metric measuring the intersection of the sides of the grid elements on the two 'x' and 'y' axes, respectively. If two grid elements have sufficient similar projection on the x-axis and y-axis, respectively, then a mathematical program may align them.

Figures 7C, 7D:
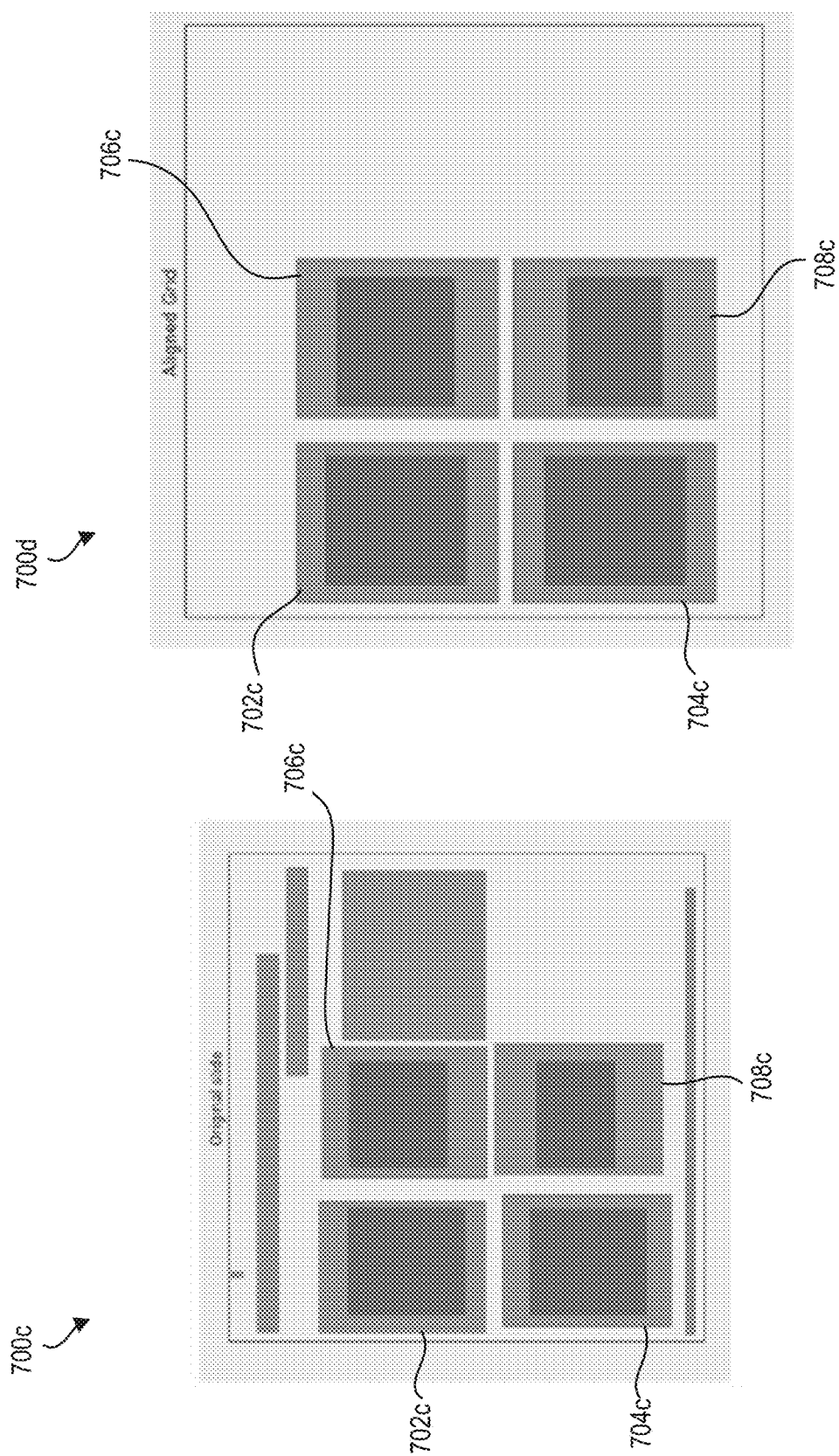
FIG. 7C illustrates an example visualization of misaligned grid elements in an example presentation slide.
FIG. 7D illustrates an example visualization of aligned grid elements in an example presentation slide.

In some examples, mathematical/quadratic programming is used to model the transformation problem, and optimize the position of the slide objects by minimizing displacement. FIG. 7C illustrates an example visualization 700c of a slide including mis-aligned grid elements 702c-708c, while FIG. 7D illustrates an example visualization 700d of a slide that includes aligned grid elements 702c-708c.

In contrast to aligning grid elements, in the example case of standardizing grid elements—this may ensure that slide objects belonging to a grid element are positioned relative to each other in the same way for all grid elements. In particular, aligning slide objects within a grid element is not an ideal solution, as it may distort the slide. Rather, it may be preferable to standardize grid elements by arranging objects within a grid element in the same way for all grid elements.

Figure 6B:
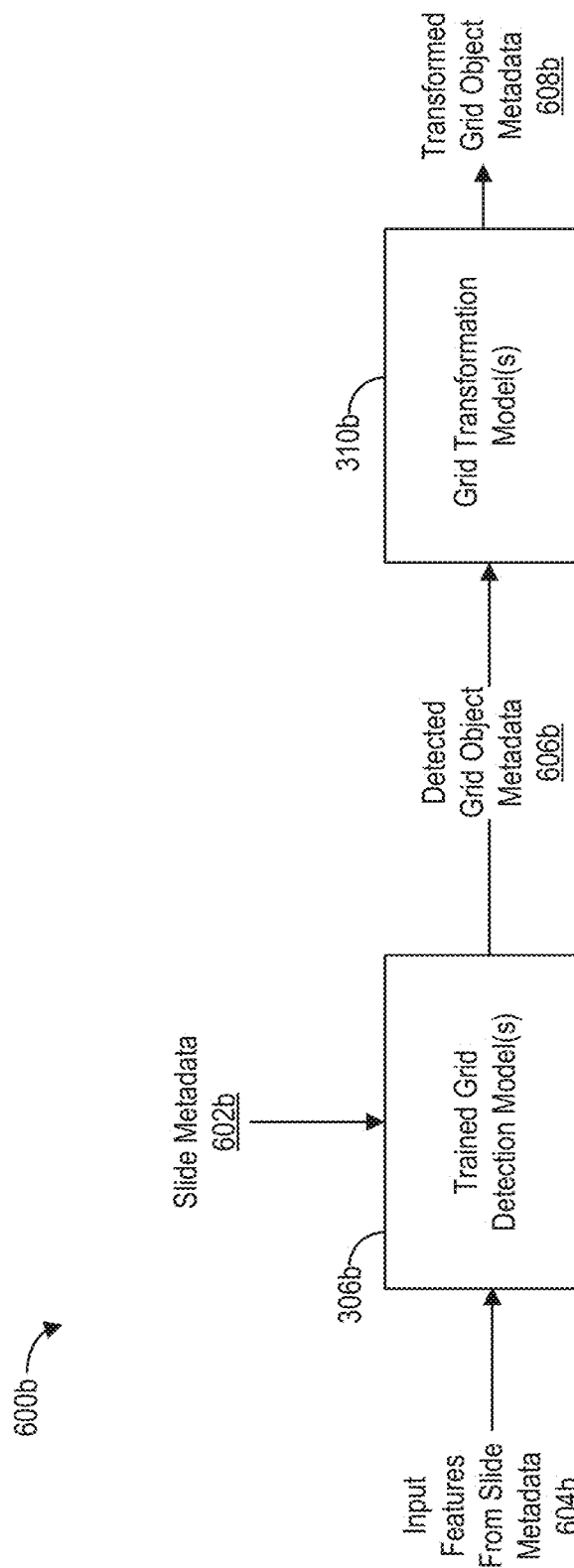
FIG. 6B is another example method for detecting and transforming grid structures in presentation slides.

Reference is now made to FIG. 6B, which shows another example method 600b for detecting and transforming grid structures in slides. Method 600b may be considered an example application of method 300b (FIG. 3B), using trained machine learning models for grid detection.

As shown, one or more input features 604b are generated and fed into a trained grid detection model 306b, along with slide metadata 602b. The input features 604b can include both property features of slide objects (e.g., 604a in FIG. 6A), including positional and size data of slide objects. Input features can also include derived property features of slide objects (e.g., 606a in FIG. 6A), including a ratio of the size of the identified shape objects, as well as the surface area of the slide objects.

The trained grid detection model 306b is applied to the input features, to detect the slide metadata corresponding to a grid structure. The trained grid detection model 306b can be a trained machine learning model, such as a trained random forest model.

The output of the grid detection model 306b is the detected grid slide object metadata 606b. The grid detection model 306b identifies the slide object metadata—in the input slide metadata—that corresponds to the grid structure.

The detected grid slide metadata 606b is accordingly fed into one or more grid transformation model(s) 310b. These models can be algorithmic, rule-based models which apply specific transformations to the detected grid metadata 606b. The grid transformation models 310b can be analogous to act 612a, in FIG. 6A. The output of the grid transformation models is transformed grid object metadata 608b.

(c) Detection and Transformation of Legends

Figure 8:
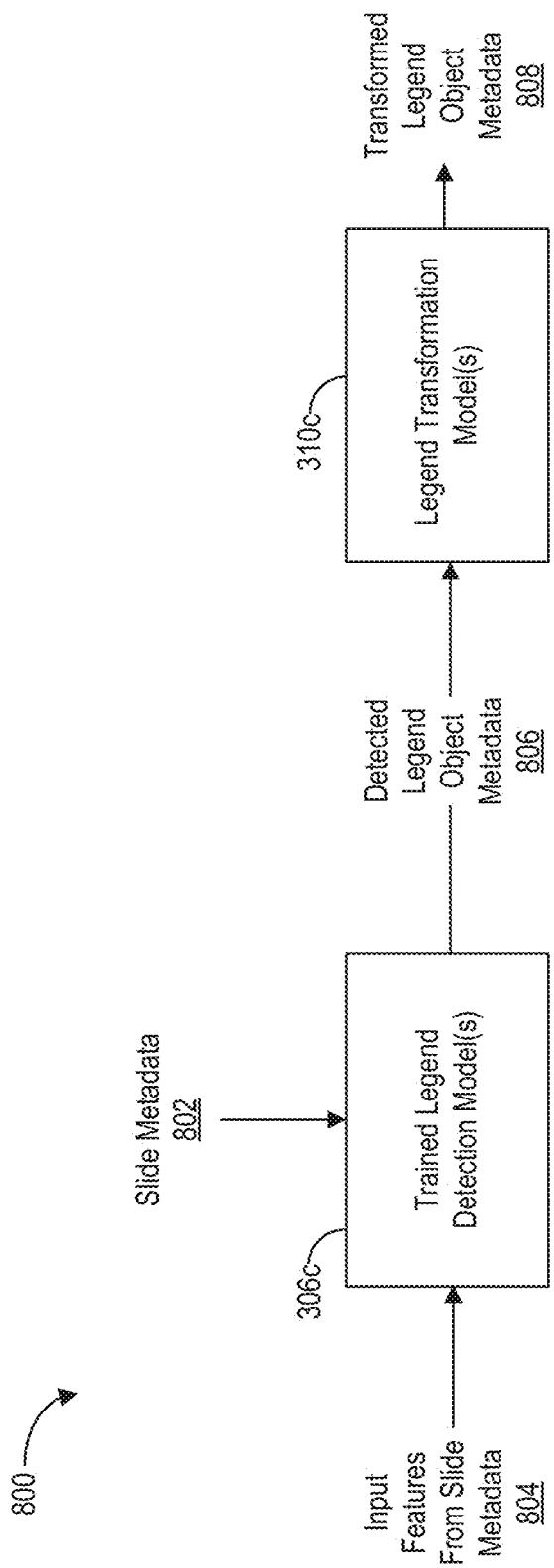
FIG. 8 is an example method for detecting and transforming legends in presentation slides.

Reference is now made to FIG. 8, which shows an example method 800 for detecting and transforming legend objects in slides. Method 800 may be considered an example application of method 300b (FIG. 3B), using trained machine learning models for legend detection.

As shown, one or more input features 804 are generated and fed into the legend detection model(s) 306c, along with the slide metadata 802. The input features can include both property features of slide objects, as well as derived property features (see e.g., Table 1, below). The property features which include "name" (e.g. textbox name) are variables that are set to '0' or '1' depending on whether the slide object metadata indicates that the slide object is labelled with that name (i.e., slide object name is "textbox", indicating the slide object is a textbox).

TABLE 1

| Example Input Features for Legend Detection Model | |
| --- | --- |
| Property Feature | Derived Property Feature |
| Position of slide object (e.g., x, y, z) | Difference to mean size (i.e., font size difference relative to slide mean font) |
| Size data (e.g., width, heigh) | Different to median size (i.e., font size difference relative to slide median font size) |
| Textual data (e.g., character count, font size, font style (e.g., bold, italic, regular) | X Density (i.e., density of shapes in a small neighborhood, based on the size of the given shape on x-axis) |
| Textbox name | Y Density (i.e., density of shapes in a small neighborhood, based on the size of the given shape on y-axis). |
| Rectangle name | |
| Legend name | |
| Text placeholder name | |
| Rectangle legend name | |
| Oval name | |
| Customicon name | |
| Arc name | |
| Legend rectangle name | |
| Rounded rectangle name | |
| q legend name | |
| Legend title name | |
| Line legend name | |

The trained grid detection model 306c is applied to the input features, to detect the slide metadata corresponding to a legend. The trained legend detection model can be a trained machine learning model, such as a trained random forest model.

The output of the legend detection model is the detected legend slide object metadata 806. In other words, the legend detection model 306c identifies the slide object metadata—in the input slide metadata—that corresponds to the legend.

In some examples, the model involves post-processing involving 2-NN blending predictions. The average prediction score is determined with the closest neighbor (x,y_center). As legends are generally pair of shapes, 2-NN neighbors are either both legend or none of them are legend The detected legend slide metadata 806 is fed into one or more grid transformation model(s) 310c. These models can be algorithmic, rule-based models which apply specific transformations to the detected legend metadata. The output of these models can be the transformed legend object metadata 808.

(d) Detection and Transformation of Tables

Analogous to grids, the structural definition of a table suffers from a level of ambiguity. In general, a table may be defined as a rectangular structure having elements forming a series of rows and columns. As tables are largely identifiable by particular arrangements of elements in a slide, the position and size of slide elements may be a focus point for table identification.

Figures 9A, 9B:
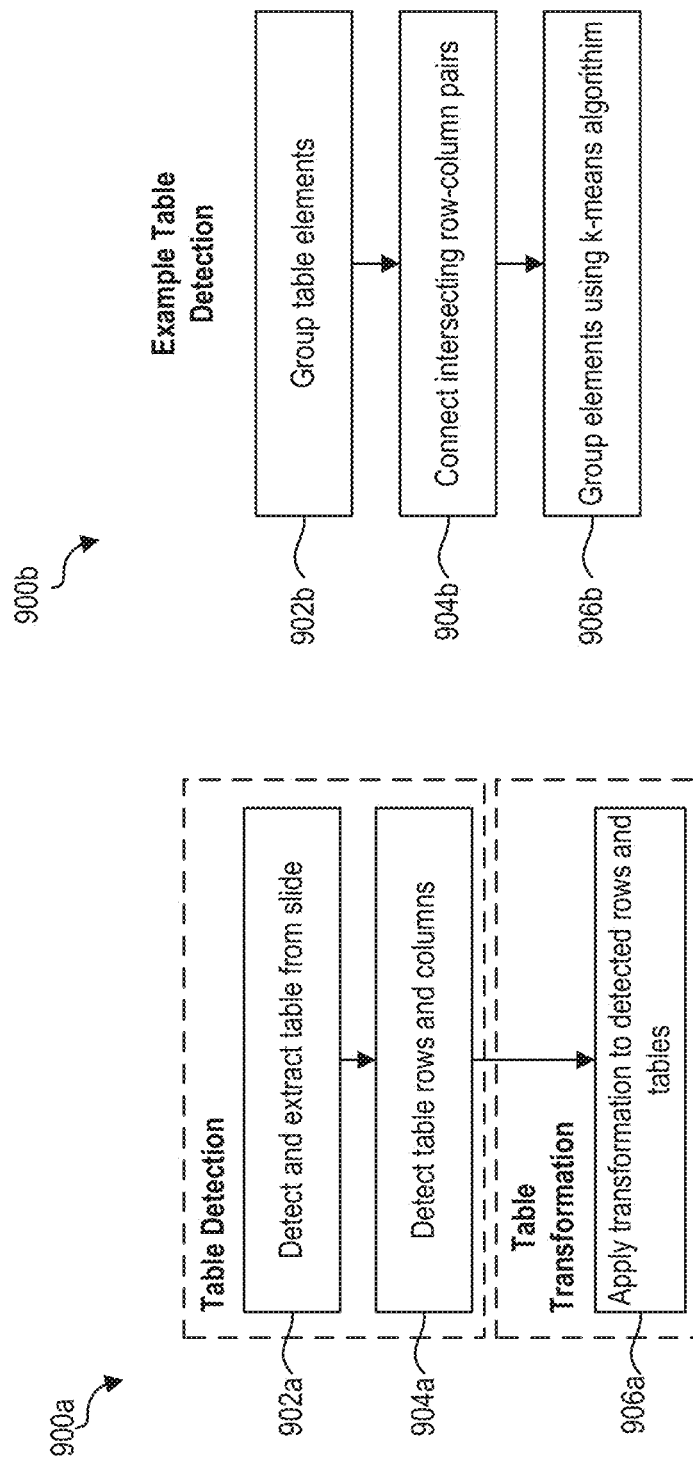
FIG. 9A is an example embodiment of a method for detecting and transforming table structures in presentation slides.
FIG. 9B is an example embodiment for a method for detecting and extracting table structures using a k-means algorithm.

Reference is now made to FIG. 9A, which shows an example method 900a for detecting and transforming tables, at a general or high-level.

At 902a, a table is detected and further extracted from the slide to ensure that slide objects, not part of the table, are eliminated. At 904a, rows and columns inside the tables are also detected. Identifying rows and columns is performed to identify groups of elements that require aligning with each other. At 906a, one or more transformations are applied to the detected rows and tables.

Reference is now made to FIG. 9B, which shows an example method 900b for detection and extraction of table elements from slides using a k-means algorithm. Method 900b may be considered an example application of acts 902a and 904a in method 900a.

The use of a k-means algorithm to retrieve tables and to detect rows and columns is based on two postulate: first, is the understanding that a table is a set of rows and columns having similar characteristics; and second, that the rows and columns are a set of elements with similar positioning and size.

As shown, at 902b, a k-means algorithm is coupled with an elbow method to determine the best number of clusters of slide objects in order to group objects with similar height positions, width positions and sizes so as to define row and column blanks.

At 904b, row-column pairs that contain an element at their intersection are connected to highlight the similarity between rows that intersect the same columns, and vice-versa.

At 906b, after connecting each element of the slide with its column itself connected to its row, the elements are grouped using a k-means algorithm to extract a set that can be considered a table.

To this end, it is appreciated that rows generally tend to be thinner and tighter than columns, and their elements tend to be less homogeneous in size, which can complicate detection. It may also seriously affect the quality of clustering rows into tables. In addition, the detection can be degraded by the presence of an empty row or column requiring extraction.

An additional level of complexity is introduced, in recognizing rows and columns, when the table includes merged cells. The presence of merged cells complicates the notion of alignment as it must be supplemented with the notion of relative intersection. The notion of relative intersection is, itself based on union and intersection in absolute values.

A table can be viewed as a set of elements, in which each pair of elements may be expressed by a coefficient that spans a spectrum between very strong or very weak. A strong coefficient is determined if the pair of elements is part of the same row or column. A weak coefficient is determined if the pair of element is neither on the same row nor on the same column. Two elements having a coefficient approaching 0.5 would therefore be unlikely to be part of the same table.

In view of the foregoing, in some examples, a relationship is calculated for each pair of slide elements forming part of a table. A network graph, such as an arc diagram, is then used to represent the coefficient relationship between each pair of elements. Further, subgraphs are extracted which contain a maximum of arcs with a high value, and the minimum arc whose value is intermediate.

Figure 10B:
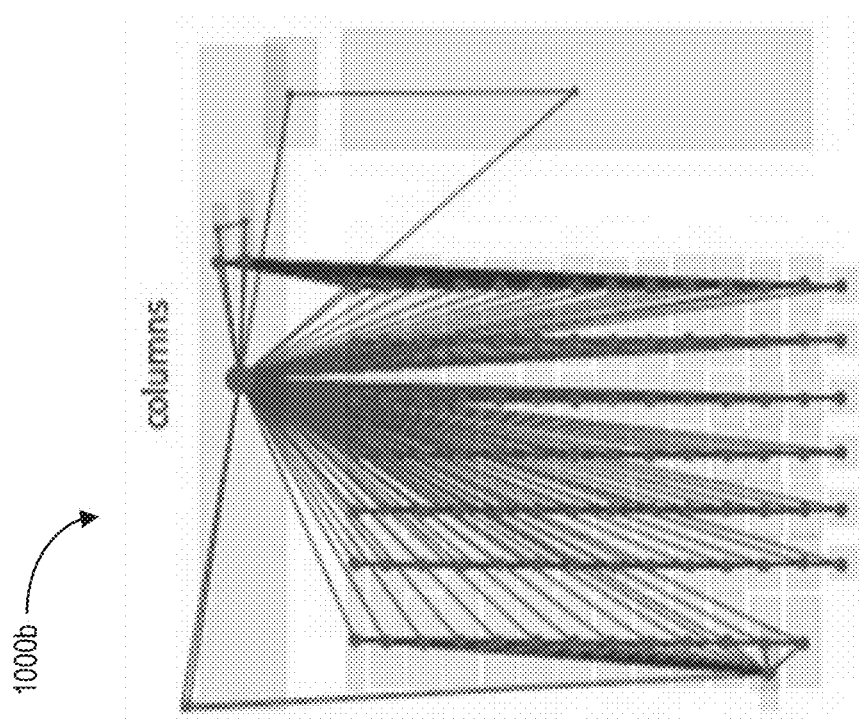
FIG. 10B is an example visualization illustrating various links defining associations between table column elements.
Figure 10A:
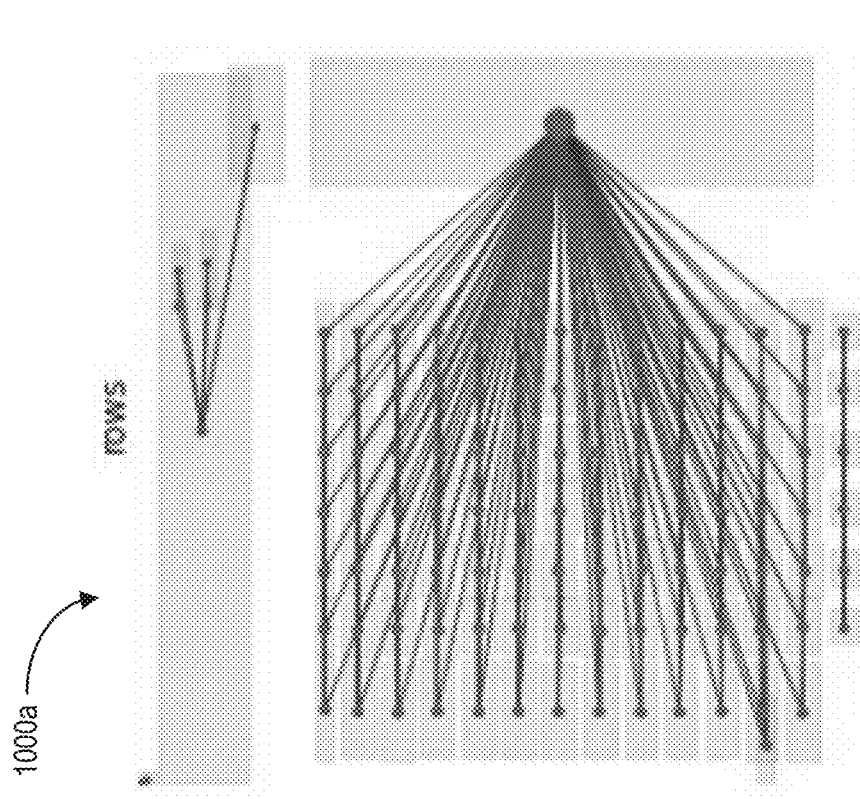
FIG. 10A is an example visualization illustrating various links defining associations between table row elements.

In at least one example, three types of arcs are defined with three values: '1' (strong), '−1' (intermediate) and '0' (low), and a score function is determined for each given graph. FIGS. 10A and 10B show links defined to determine associated row elements (visualization 1000a in FIG. 10A) and column elements (visualization 1000b in FIG. 10B) in an example table. In this example, darker lines indicate positive links and lighter lines indicate negative links.

Reference is now made to FIG. 9C, which shows another example method 900c for extracting tables and detecting table rows and columns using an intersection based method.

At 902c, a coefficient is determined for each pair of elements in the table. At 904c, a graph (e.g., an arc graph) is generated with links representing the determined coefficients. At 906c and 908c, a search is performed for the subgraph with a minimizing score. Accordingly, at 906c, for each subgraph—deletion of the left-most, rightmost, topmost and lowest elements are tested as well as, at 908c, deletion of elements that are connected to the element.

At 910c, the case is selected that minimizes the score previously defined as the lowest score. This may be repeated iteratively until the graph is empty and the step at which the score is the lowest is maintained.

Figure 10D:
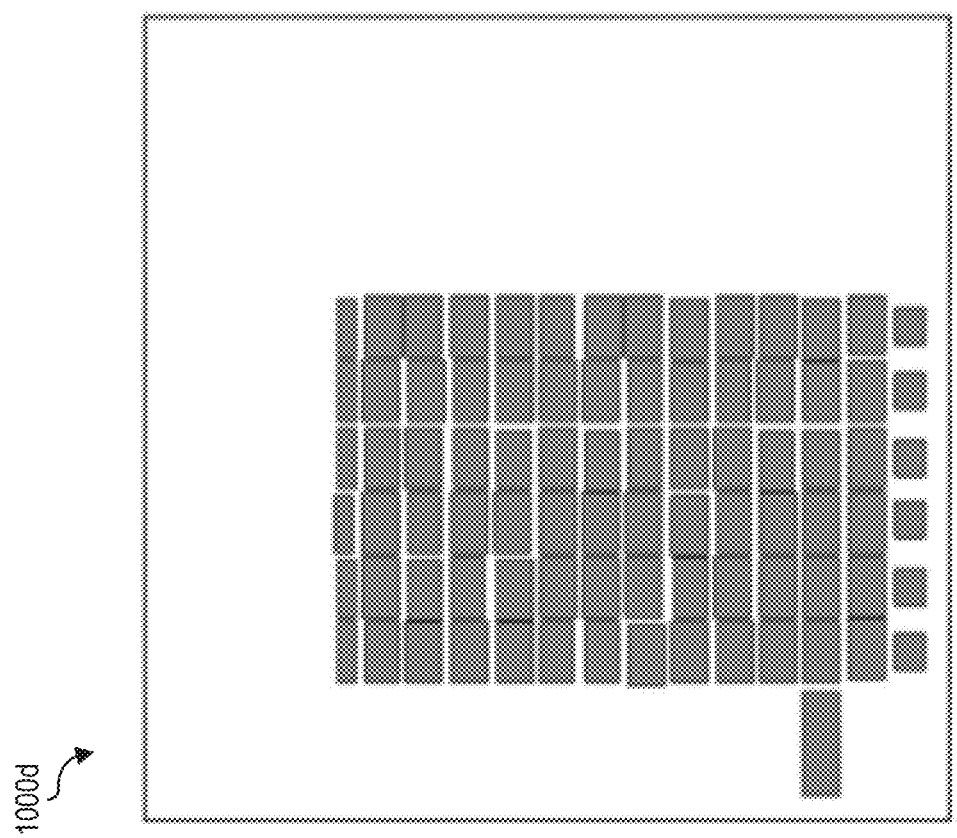
FIG. 10D is an example slide that includes only a detected table structure.
Figure 10C:
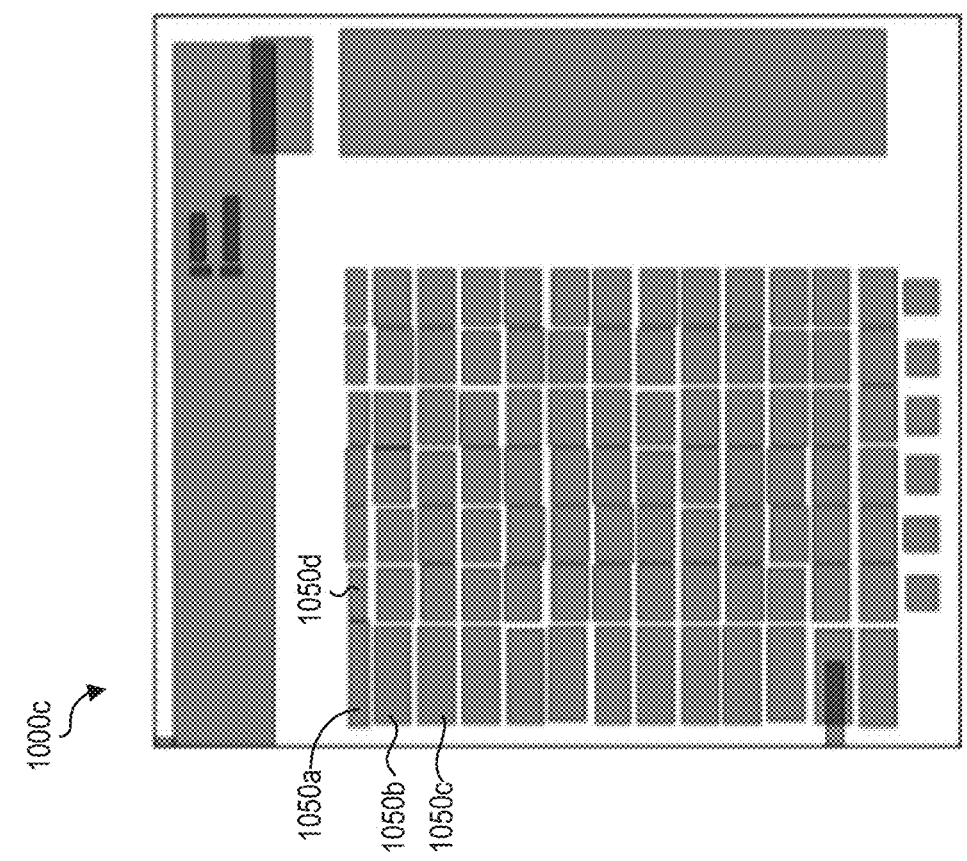
FIG. 10C is an example slide that includes a table structure.

FIG. 10C shows an example visual representation 1000c of an example slide that includes a table, while FIG. 10D shows an example visual representation 1000d that includes a subset defined as table by the modelling algorithm in method 900c.

Reference is now made to FIG. 9D, which shows an example method 900d for retrieving tables and detecting rows and columns using a combination of k-means and intersection based methods.

As shown, at 902d, one or more object shapes (i.e., slide objects) are identified in the metadata file that is generated based on the slide.

At 904d, the identified shapes are clustered into one or more rows and columns. As discussed previously with respect to method 900b, the clustering may occur by identifying one or more property features of the shape object (e.g., position and size of each identified shape).

In some examples, the shape objects are clustered using a k-means method on each of the two axes, and by increasing the number of clusters until the resulting clusters do not present two columnar shapes for the rows, or do not present two row shapes for each column.

At 906d, each cluster is reduced to a median value, and the intersections are calculated by projecting the clusters two by two on each of the two axes. If an intersection is greater than a threshold value, then the value of that intersection is set to a value of '1', and if the intersection is lower than the threshold value, then the intersection value is set to '0'.

At 908*d*, table headers are shape clusters are formatted into tables.

Figure 11:
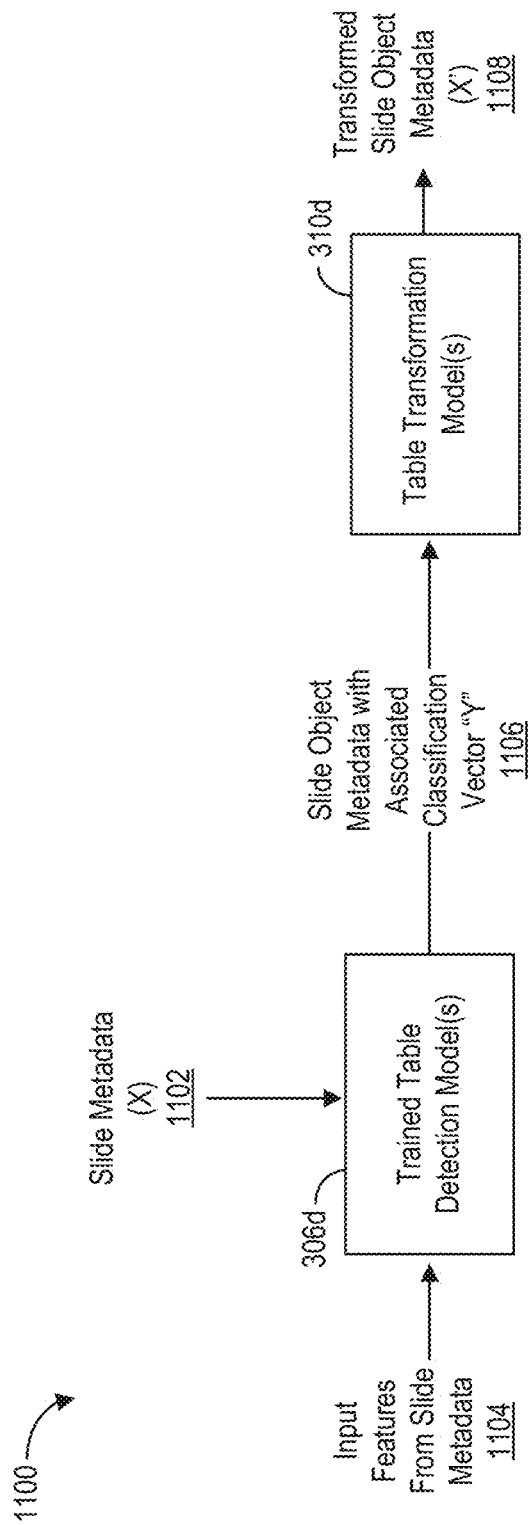
FIG. 11 is another example method for detecting and transforming table structures in presentation slides.

Reference is now made to FIG. 11, which shows a high-level, process flow for another example method 1100 for table detection and transformation.

As contrasted to methods 900*a*-900*d* (FIGS. 9A-9D), method 1100 uses a combination of machine learning and rule-based algorithms to: (i) detect slide objects located in a table structure, and (ii) further, transform these slide objects to generate a transformed table structure. Method 1100 is therefore an example application of method 300*b* (FIG. 3B) for table detection and transformation.

At a broad level, method 1100 receives slide metadata 1102. The slide metadata can include metadata for one or more objects in a slide (e.g., slide object metadata). For example, the slide metadata can include property features for each slide object. Property features can include geometric data for a slide object, including position data (e.g., slide object position in a slide), as well as slide object dimensions (e.g., width and height), and slide object type. For textual objects, metadata property features can also include various textual data (e.g., the font, font size, length of text). The slide object metadata is fed into one or more table detection models 306*d*.

Table detection models 306*d* can also receive one or more input features 1104. Broadly, the input features can include property features corresponding to raw, unprocessed slide object metadata. In this sense, there is overlap between the input features 1104 and the slide metadata 1102. However, the input features can also include derived property features, which are determined by the system from slide object property features. Each slide object can therefore include corresponding metadata and input features, which are fed into the table detection models 306*d*.

As shown, the one or more table detection models receive the slide object metadata 1102 and corresponding input features 1104. The table detection models analyze the input features 1104, for each slide object, to detect which slide objects are associated with a table structure.

In at least one example, the table detection models 306*d* comprise various trained machine learning models. The machine learning models are trained to analyze the input features to identify, in the slide metadata, which slide objects are associated with table structures.

The output, of the table detection models 306*d*, are one or more output classification vectors "Y" 1106. In some examples, an output classification vector "Y" is generated for each slide object.

In at least one example, each output vector "Y" can have four variables characterized by $Y=[Y_0, Y_1, Y_2, Y_3]$. First variable "$Y_0$" can indicate, at the slide level, whether the slide—that includes a given slide object—includes a table. This can be a binary indication of "1" or "0", based on whether or not a table is detected in the slide, as a whole Accordingly, all slide objects located in a slide having a detected table will include a vector "Y", whereby variable $Y_0=1$. For these slide objects, $Y_0=1$ irrespective of whether that slide object is actually located within the table.

Second variable "$Y_1$" can indicate, at the slide object level, whether or not the slide object belongs to the table. This variable can also be a binary indication of "1" or "0". Accordingly, only slide objects that are detected within a table structure will have a vector "Y", whereby $Y_1=1$. The variable "$Y_1$" may only find relevance if $Y_0=1$, thereby indicating that a table structure is found in the slide.

Third variable "$Y_2$" can indicate, also at the slide object level, which cell of the table each slide object is located within. In some examples, this variable can include information about the table column and table row which contains the slide object. This variable can also indicate the column span and the row span (e.g., for merged cells), for the table cell which contains the slide object. The variable "$Y_2$" may only find relevance if $Y_1=1$, thereby indicating that the slide object is located within a table.

Fourth variable "$Y_3$" can indicate, at the slide object level, whether or not the slide object belongs to a header cell. In some examples, this information is used for table transformations and re-alignment of cells.

In this manner, each slide object can have an associated classification vector $Y=[Y_0, Y_1, Y_2, Y_3]$. As provided herein, different trained models can be used to generate different output variables $Y_0, Y_1, Y_2, Y_3$. For example, one or more first trained models can determine variable $Y_0$, while one or more second trained models can determine variable $Y_1$, and so forth. In other examples, a single trained model is used to determine all variables, or any subset of variables.

In at least one example, it is not necessary that the output classification vector include all of the output variables $Y_0, Y_1, Y_2, Y_3$. For example, it may be sufficient to simply determine an output variable $Y=[Y_1, Y_2]$. In other words, it may be simply sufficient—for the purposes of table detection—to determine if each slide object is located within a table structure ($Y_1$), and its position within the table structure ($Y_2$).

The output of the table detection models 306*d* is fed into one or more table transformation models 310*d*. The output of the table detection models 306*d* can include the slide object metadata, as well as the associated classification vector "Y" for that slide object.

The table transformation models use the classification vector "Y" to determine which slide objects are located in a table structure, as well its position in the table structure. The transformation models subsequently apply one or more transformations to the underlying metadata for those slide objects. In this manner, the table transformation models 310*d* generate transformed slide object metadata 1108. The transformed slide object metadata 1108 corresponds to a transformed table structure. For example, the table transformation models may re-align slide objects within the table, and/or re-format the table structure.

Figure 12A:
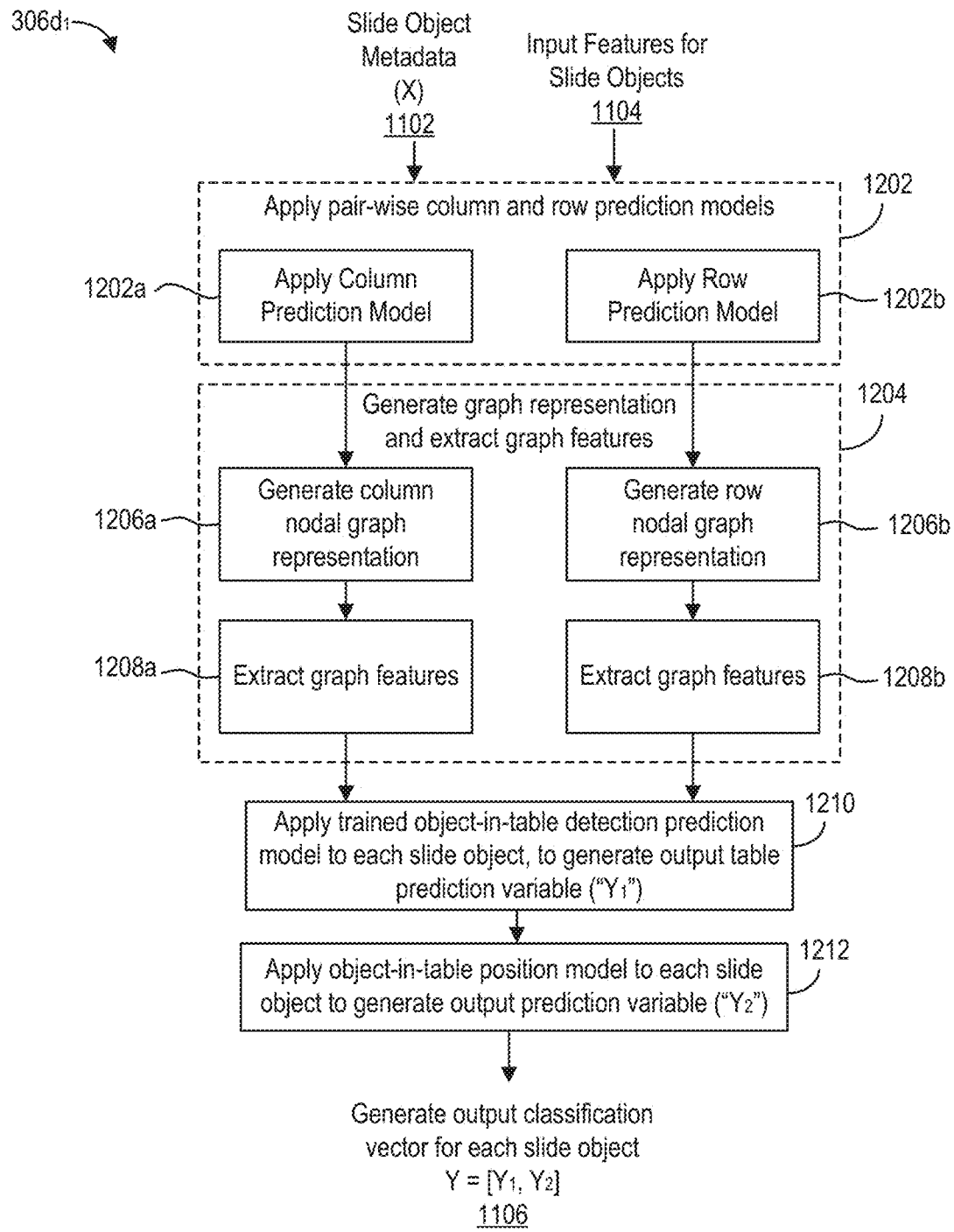
FIGS. 12A-12D are various example methods for detecting table structures in presentation slides.

Reference is now made to FIG. 12A, which shows an example method 306*d*₁ for applying the one or more table detection models 306*d* (FIG. 11). Method 1200*a* shows a simplified example, whereby the output classification vector $Y=[Y_1, Y_2]$.

As shown, metadata 1102 and input features 1104 are received for one or more slide objects, on a given slide.

At 1202, trained pair-wise column and row prediction models are applied to the input features. The prediction models include a column prediction model 1202*a*, and a row prediction model 1202*b*.

At a high level, the column prediction model 1202*a* can predict if pair of slide objects are located in the same table column. In contrast, the row prediction model 1202*b* can predict if pairs of slide objects are locate in the same table row. By predicting if pairs of slide objects are located in similar columns or rows—the system can make an initial determination as to which slides objects are formatted into a table (e.g., as part of table detection).

In more detail, the column prediction model 1202*a* iterates over each pair of slide objects, in the received metadata 1102, and determines the likelihood that any pair of objects is located in the same table column.

For example, in FIG. 10C—the column prediction model 1202a can positively predict that slide object pairs 1050a and 1050b are located in the same column. The column prediction model 1202a can also positively predict that slide object pairs 1050a and 1050c, as well as 1050b and 1050c are also both located in the same column.

Accordingly, in at least one example, if there are 15 slide objects, the column prediction model 1202a generates—for each slide object—14 outputs indicating whether that slide object is in the same column as every other one of the 14 slide objects. This is iterated, and repeated for each of the 15 slides objects.

The output, of the column prediction model 1202a, is then—for each slide object—an array of binary outputs. Each binary output indicates whether the slide object is, or is not, in the same column as every other slide object. In other examples, the array comprises confidence levels, or probabilities, that each slide object pair is in the same column.

By a similar token, the row prediction model 1202b predicts if each pair of slides objects is located in same the table row, as every other slide object. For example, as shown in FIG. 10C, the row prediction model 1202b can predict that slide object pairs 1050a and 1050d are located in the same row. A separate output is generated, by the row prediction model 1202b, for each slide object. The output, for each slide object, can therefore comprise an array of values, indicating whether that slide object is, or is not, in the same row as every other slide object. The array can include binary values, or probability confidence levels.

In some examples, separate machine learning models are trained, and applied for each of the column prediction model 1202a and the row prediction model 1202b. In at least one example, both models use a trained random forest machine learning model to generate predictions.

To generate predictions, each machine learning model 1202a, 1202b can receive the input feature data comprising, for one or more slide objects: (i) property feature data, and/or (ii) derived property feature data.

As noted previously, property features can simply correspond to the raw metadata associated with each slide object. Derived property features include features that are derived, or determined from the property features.

Various types of derived features can be determined, and fed into the row and column prediction models. For example, derived features can include various combined properties generated by combining slide object-level property features of two slide objects (e.g. distance, horizontal overlap, vertical overlap, etc.).

For instance, a derived features can include a combined array of the sizes of different pairs of slide objects (e.g., (width object #1, width object #2)). This is also referenced herein as a feature pair. Similar feature pair arrays are generated for other property features, as between a pair of slide objects.

Other derived property features can also be generated by combining property features for pairs of slide objects. For example, these include derived features, as expressed in Table 2, below. In the example below, derived features that include the term "same" are allocated a binary value of "1" if the pair of slide objects have the same property (e.g., same "x" horizontal coordinate on left edge, or "y" vertical coordinate of top edge), and "0" if the pair of objects do not have that same property.

TABLE 2

Example Derived Features for Column and Row Prediction Models

| | |
|---|---|
| Average 'x' position of object pair | Same width and height |
| Average width of objects | Average area of objects |
| Average 'y' position of objects | Horizontal disproportion |
| Average height | Vertical disproportion |
| Same 'x' | Horizontal overlap |
| Same 'y' | Normalized horizontal overlap |
| Same width | Vertical disproportion |
| Same height | Normalized vertical disproportion |
| Same right (i.e., same vertical coordinate of bottom edge of slide object) | Horizontal distance (i.e., distance between the two closest edges of the two slide objects (e.g., left and right edges)) |
| Same bottom (i.e., same horizontal coordinate of the right edge of slide object) | Normalized horizontal distance |
| Same 'y' center | Vertical distance (i.e., distance between the two closest edges of the two shapes (e.g., top and bottom edges)) |
| Same 'x' center | Normalized vertical distance |
| Same type | Similar text length |
| Same 'x' rank ‡ | Both objects have text |
| Same 'y' rank ‡ | Both objects do not have text |
| Same bottom rank ‡ | Both objects are images |
| Same right rank ‡ | Both objects are icons |
| Same color | Pattern of icon and text |
| Same class | Both objects are outers |
| Same name | |
| Same shape type | |

‡ Rank is the order of the object in the slide, and each object has a rank extracted from the metadata (e.g., this can be visualized when two objects are placed over one another: the top rank will show and the low rank is hidden behind).

At 1204, the outputs of the column and row prediction models are used to generate nodal graph representations, and further, to extract graph features.

More particularly, at 1206a-graph representations are generated, which express the interrelationship between different slide objects. A separate graph representation 1206a can be generated using the output of the column prediction model, and the output of the row prediction model 1206b.

The graph for the column representation 1206a expresses each slide object as a separate node. A pair of nodes are connected if the column prediction is "1" for those slide object pairs. An example column graph representation is shown in FIG. 10B, whereby lines connect related slide object nodes. A separate row graph representation 1206b is also generated based on the results of the row prediction model (see e.g., FIG. 10A). Two nodes are also connected if their column prediction, or confidence level is "1".

In this manner, the column and row prediction models, at act 1202, facilitate determining the likelihood pairs of slide objects are located in the same row and column—further, the graph representation, at act 1206, expresses this result in graphical nodal form.

At 1208a, 1208b, for each of the generated column and row graphs—one or more graph features are extracted. Various graph features can be extracted at act 1208. For instance, in at least one example, "cliques" are extracted from each of the column and row graphs. As is well understood in the art of graph theory, a "clique" refers to a subset of nodes, or vertices of an undirected graph, whereby every node is connected to one another.

The extraction of a clique from both column and row graphs helps to localize, and extract only those nodes (e.g., slide objects) which are interrelated to form a table (FIGS. 10A, 10B). Nodes which are not in the clique can be regarded as unlikely to be part of a table object in a slide. The generating of the graph, and extracting of cliques can be based on any known method in the art, as is generally known in graph theory.

In at least one example, the extracted graph features can also include a "cliqueness index" for each graph node, or slide object. The cliqueness index is a value between "0" and "1", whereby "1" indicates that the slide object is within a clique.

For instance, let G be a connected graph, N is its number of nodes and E is its number of edges. In this case, the cliqueness index is determined as E/number of edges of G, if G is a clique, where the number of edges of G if G is a clique=N(N−1)/2. In some examples, thresholds are used such that the a node (i.e., slide object) is determined to be part of a clique if it has a cliqueness index above a pre-determined threshold (e.g., 0.3).

At 1210, a trained object-in-table prediction model is applied to each slide object. This trained model can generate a prediction regarding whether each slide object is, or is not, located in a table structure, within the slide.

The object-in-table prediction model can receive several input features in order to generate its prediction. For example, these include the various extracted row and column graph features, at 1208a, 1208b. For instance, these can include the row and column cliqueness index for each slide object, indicating the probability that the slide object belongs to a column or row. The model is trained to receive these input features for each slide object, and in turn, to predict the probability that the slide object is located within a table structure.

In at least one example, the trained object-in-table prediction model is a trained machine learning model, such as a trained random forest model.

For each slide object, the object-in-table model can output a variable ("$Y_1$"). As noted previously, the output variable ("$Y_1$") is a binary indication of whether that slide object is, or is not, located in a table structures within the slide. In other examples, $Y_1$ can be a confidence value, or probability, that a slide object is located within a table structure. In some examples, the variable $Y_1$ is determined for each slide object, located within a slide.

At 1212, an object-in-table position determination model is applied to each slide object. This model predicts the position, in a table, where the slide object is located. In other words, whereas act 1210 broadly identifies that a slide object is located in a table—act 1212 additionally predicts where in the table the slide object is located (e.g., column cell, and row cell). In some examples, act 1212 is only applied to those slide objects associated with $Y_1=1$, or otherwise a $Y_1$ greater than a pre-determined confidence threshold (e.g., 0.8).

The object-in-table position model may not necessarily be a machine learning model, but can be a rule-based algorithm. The model can use rules derived from row/column identification, performed at 1206, and their horizontal/vertical rank-ordering. The rank-ordering is determined based on the mean of the x-axis (i.e., horizontal) and the mean of the y-axis (i.e., vertical) of all the objects belonging to a column or row. This allows assigning a column number and row number to slide objects.

The output of the position model 1212 can be—in respect of each assessed slide object—a value for the variable $Y_2$. As stated previously, $Y_2$ can include information about the table column and table row which contain the slide object. This variable can also indicate the column span and the row span (e.g., for merged cells), for the table cell which contains the slide object.

A subtlety of the position model, at act 1212, concerns the identification of slide objects spanning over several table columns or rows. Here as well, graph-related concepts are used: for example, let G be a connected graph, that is, a component in the overall graph. If G is a clique, then there is no spanning object shape. However, if G is not a clique and one of the nodes is connected to all the other nodes, it is defined as a spanning shape object. Accordingly, this can be accounted for in the position model. For example, the position model can compute the number of components in G without the spanning shape and set it as the span value for the spanning shape.

At 1116, in relation to each slide object—an output vector "Y" is generated, whereby Y=[$Y_1$, $Y_2$]. In some examples, the output vector "Y" is only generated for slide objects having $Y_1=1$, thereby indicating that the slide object is inside a table structure.

Figure 12B:
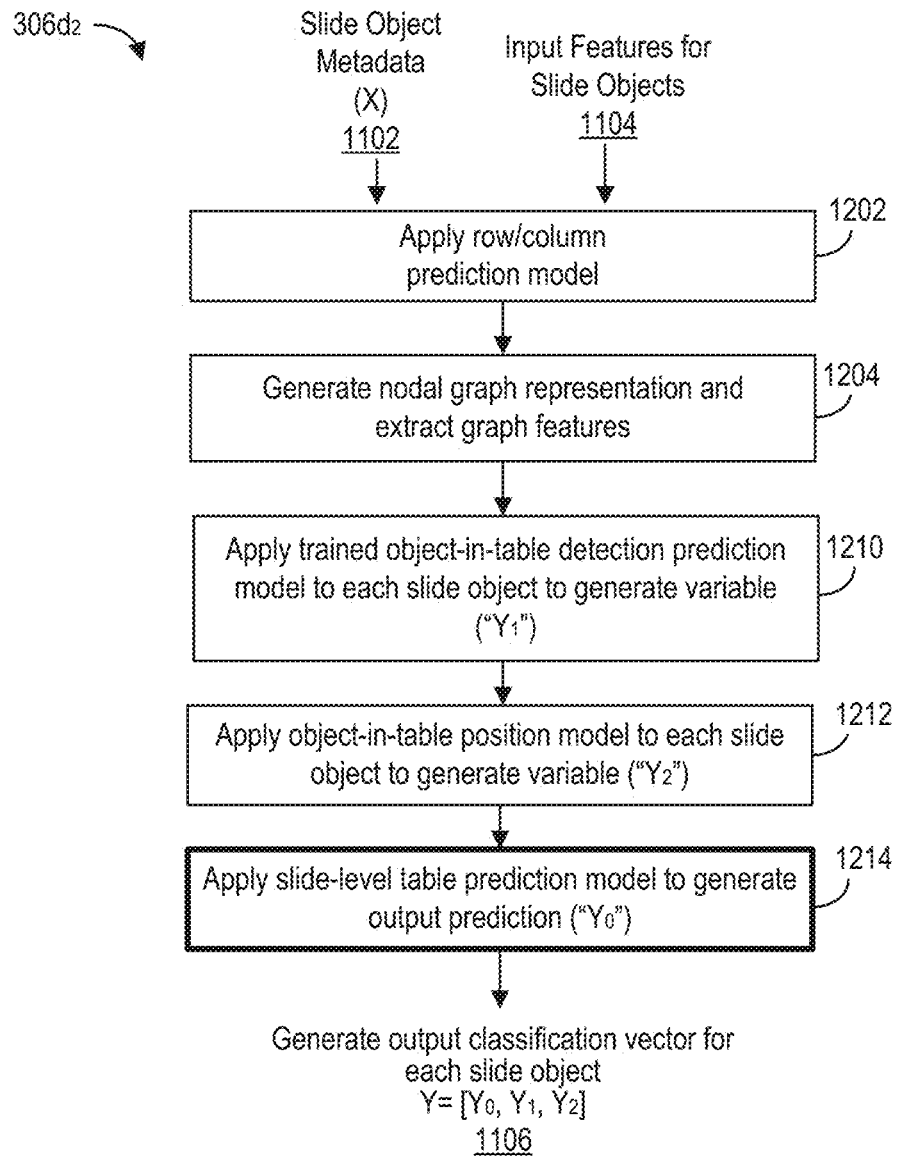

Reference is now made to FIG. 12B, which shows another example method 302$d_2$ for table detection, and generating an output classification vector "Y" for each slide object.

Method 306$d_2$ is generally analogous to method 302$d_1$, with the exception that method 306$d_2$ includes act 1214. Act 1214 generates a variable "$Y_0$", which predicts whether the slide, as a whole, include a table structure.

In some aspects, act 1214 uses a slide-level table prediction model, which is a machine learning algorithm aimed at predicting $Y_0$ based input features comprising both property level features, and derived property features at the slide level. In some examples, the derived property features are obtained by aggregating object-level property features, and all the previous model results (e.g., 1202-1212).

In more detail, the model receives the slide as a data frame, then the features are aggregated to generate slide level features. In addition, a derived feature can be generated, corresponding to a $Y_1$ frequency—or otherwise, the ratio of slide objects with a positive $Y_1$ ($Y_1=1$).

In some examples, the slide-level table prediction model is a trained random forest model. The trained model outputs, for each slide, a predicted binary score that represents if the slide contains a table or not.

At 1106, an output classification vector Y=[$Y_0$, $Y_1$, $Y_2$] is generated for one or more slide objects, whereby $Y_0$ is "1" (i.e., positive) for any slide object located on a slide that includes a table structure.

Figure 12C:
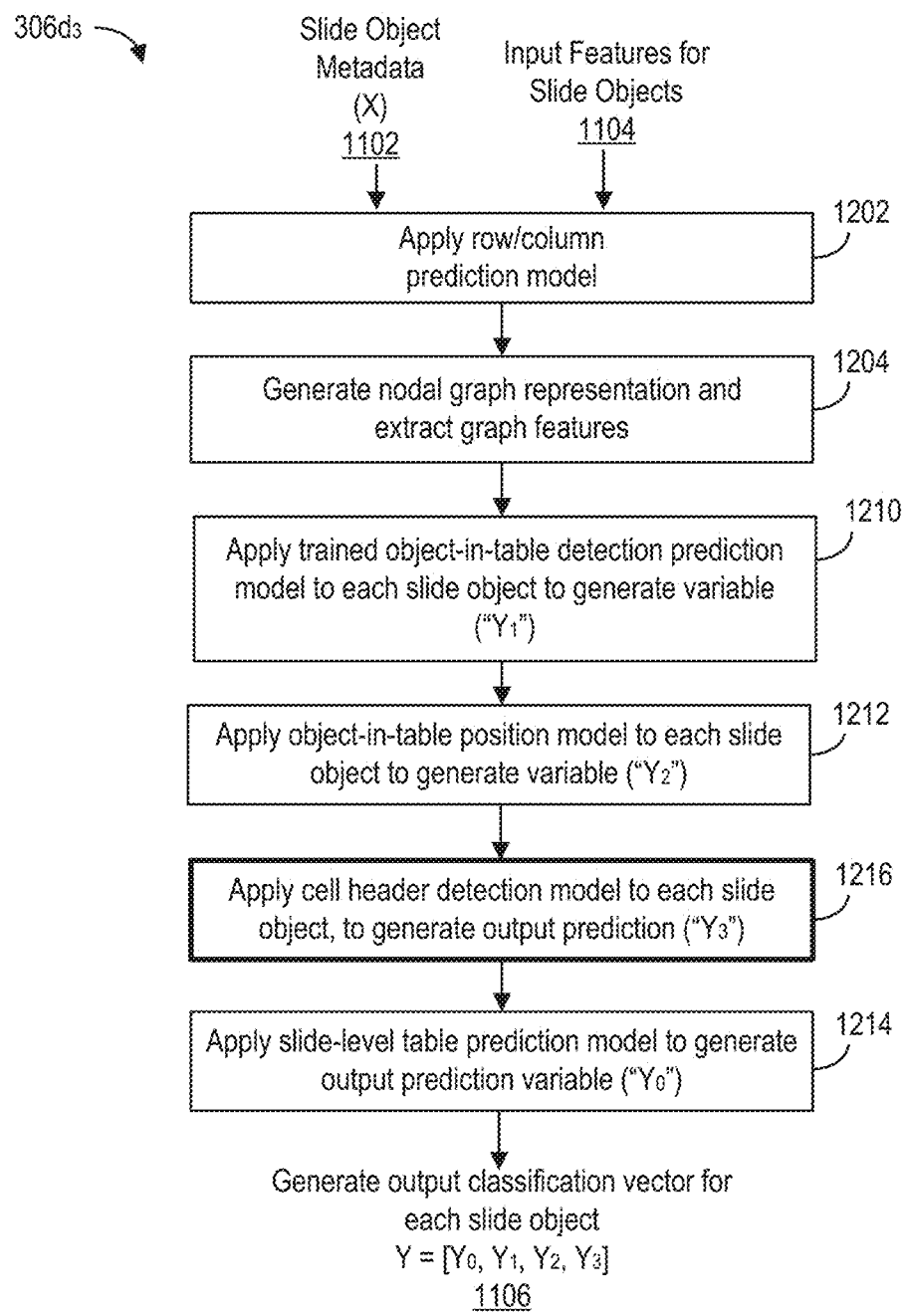

Reference is now made to FIG. 12C, which shows another example method 306$d_3$ for table detection, and generating an output classification vector ("Y") for one or more slide objects.

Method 306$d_3$ is generally analogous to method 306$d_2$, but additionally includes act 1216. At act 1216, a cell header detection model is applied to one or more slide objects to determine whether the slide objects are associated with a "header cell", in a table structure. An output variable $Y_3$ is generated, which can be a binary output indicating whether or not the slide object is associated with a header cell.

In some examples, the cell header model is a trained machine learning model. For example, the cell header model can be a trained random forest model. The input features into the cell header model can include the outputs of acts 1202-1212, as well as some of the same input features used in the models used at acts 1202-1212.

At 1106, an output vector Y=[$Y_0$, $Y_1$, $Y_2$, $Y_3$] is generated, whereby $Y_3$="1" for a slide object associated with a header cell. In some examples, act 1216 may be performed without act 1214, such as to produce an output vector Y=[$Y_1$, $Y_2$, $Y_3$].

Figure 12D:
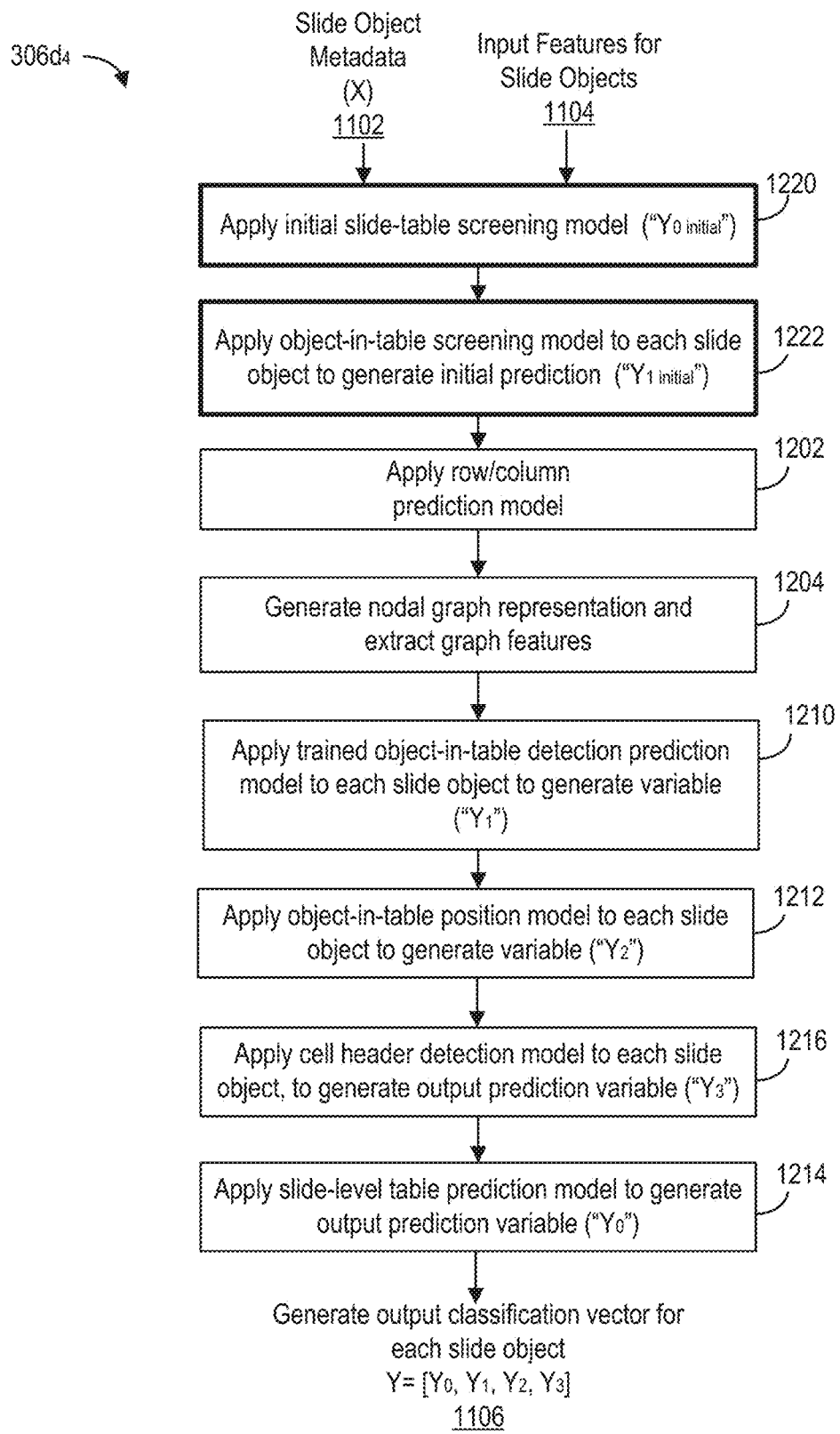

Reference is now made to FIG. 12D, which shows another example method 306$d_4$ for table detection, and for generating an output classification vector "Y" for each slide object.

Method $306d_4$ is generally analogous to method $306d_3$, with the exception that the method includes initial acts 1220 and 1222. Acts 1220 and 1222 generate initial predictions for output variables ("$Y_0$") and ($Y_1$"). Output variable $Y_0$ is a determination of whether or not the slide includes a table, while output variable $Y_1$ is a determination of whether a slide shape is included in a table.

More particularly, while acts 1210 and 1214 generate the final determination for output variables $Y_0$, $Y_1$—acts 1220 and 1222 may provide an initial screening, or an initial prediction. It has been appreciated that this initial prediction can enhance the predictive outcome of various models subsequently applied at acts 1202-1214. For example, by generating an initial prediction that a slide has a table structure, the model which identifies which slide objects are included in a table structure (e.g., the column and row prediction models), can be enhanced on this presumptive basis.

In more detail, at act 1210—an initial slide-table screening model is applied to the slide objects. The slide-table screening model generates an initial determination ("$Y_{0\ initial}$") as to whether the slide includes a table. The slide-table screening model can be a trained machine learning model. In some examples, the trained machine learning model is a trained random forest model.

The output of the model ("$Y_{0\ initial}$") can be a confidence core (0 to 1) regarding the probability the slide includes a table. That is, the machine learning model analyzes the input slide shapes to determine whether it is likely these slide shapes are arranged in a tabular structure.

To generate accurate predictive outputs, the slide-table screening model can receive a plurality of input features. Table 3, below, lists examples of derived features the system can generate from the property features, and can be fed as input features into the model.

TABLE 3

Example Derived Features Input into Initial Slide-Level Table Screening Model

| Features | Description |
| --- | --- |
| Slide Size | Number of objects in the slide |
| Text frequency | The ratio of objects detected as text |
| Image frequency | The ratio of objects detected as images |
| Thinkcell frequency | The ratio of objects detected as a Thinkcell ® (i.e., third party PowerPoint ® add-in) |
| Outers Frequency | The ratio of objects detected as outer elements (e.g. footnote, legend, title etc.) |
| Icon Frequency | The ratio of objects detected as icons |
| Header Frequency | The ratio of objects detected as headers (e.g., column header or row header) |
| Text Runs Lengths Mean | Mean of text runs lengths in the slide |
| Characters Count Mean | Mean of text boxes characters counts |
| Characters Count Std | Standard deviation of text boxes characters counts |
| X Rank Mean | Mean of X rank (i.e., the feature that represents the rank of the object in the slide given its left on the X-axis) |
| X Rank Std | Standard deviation of X rank |
| Y Rank Mean | Mean of Y rank (i.e., the feature that represents the rank of the object in the slide given its top on the Y axis) |
| Y Rank STD | Standard deviation of Y rank |
| Bottom Rank Mean | Mean of Bottom rank (i.e., the feature that represents the rank of the object in the slide given its bottom on the Y-axis) |
| Bottom Rank STD | Standard deviation of bottom rank |

TABLE 3-continued

Example Derived Features Input into Initial Slide-Level Table Screening Model

| Features | Description |
| --- | --- |
| Right Rank Mean | Mean of right rank (i.e., the feature that represents the rank of the object in the slide given its bottom on the X-axis) |
| Right Rank STD | Standard deviation of right rank |
| Outsiders Frequency | Ratio of objects outside the active zone of the slide - the active zone is a fixed delimited rectangular area, defined by a template presentation, in which all objects must fall, except for a few exceptions (e.g., titles and footnotes). |
| Keep Aspect Ratio Frequency | Ratio of objects with keep aspect ratio parameter - keep aspect ratio' is a check the box at shape level that a PowerPoint ® user can use to insure the (i.e., height/width) ratio is always preserved when manipulating the shape. |
| Max Font Size STD | Standard deviation of maximum font size of text boxes |
| Marvin Presence | Presence of at least one shape with a Marvin ® tag (i.e., a third party add in) |
| Unique Colors Count | Count of unique colors in the slide |
| Mean Object Area | The mean of object area in the slide |
| Std Shapes Area | The standard deviation of object area in the slide |
| Separators Frequency | Ratio of separators in the slide - separator are lines separating columns (vertical) or rows (horizontal). |

In some examples, the output of the model ("$Y_{0\ initial}$") is fed as an input into each of the models 1022, 1202-1214. The input features in Table 3 can also be used as input features into other models, including at act 1214 (e.g., in methods $306d_1$-$306d_4$).

At 1222, a further screening model can be applied to determine if each slide object is located in a table. This screening model can be a predecessor to act 1210, and can generate an initial output ("$Y_{1\ initial}$") for one or more slide objects.

The model, at act 1222, can be a machine learning model, such as a trained random forest model. The input features into the model can be property features related to each slide object, as well as the $Y_{0\ initial}$ (act 1220), and one or more determined derived features (see e.g., Table 4, below). The output can be a confidence value (0 to 1), representing the probability a shape belongs to a table.

TABLE 4

Example Derived Features for Object-in-Table Screening Model

| Input Feature | Description |
| --- | --- |
| X | X coordinate (left) |
| Y | Y coordinate (top) |
| Right | X coordinate (right) |
| Bottom | Y coordinate (bottom) |
| X Centre | X centre (centre between left and right) coordinate |
| Y Centre | Y centre (centre between top and bottom) coordinate |
| X Rank | (Previously explained) |
| Y Rank | (Previously explained) |
| Right Rank | (Previously explained) |
| Bottom Rank | (Previously explained) |
| Width | Width of the object |
| Height | Height of the object |
| Name | Name of the object normalized into a list of categories |
| Class Name | The feature represents a name of the class of the object following Igai detection |
| Can Be Moved | A boolean that represents if the object can be moved |
| Has Text Frame | A boolean that represents if the object has text |

TABLE 4-continued

Example Derived Features for Object-in-Table Screening Model

| Input Feature | Description |
| --- | --- |
| Text Frame Auto Size | A boolean that represents if the text (if it exists) is auto sized (ppt parameter) |
| Keep Aspect Ratio | A boolean that represents if the object has a keep aspect ratio parameter |
| Z Order | Order of the object following z axis |
| Shape Type | Type of the object normalised into a list of categories |
| Auto Shape Type | Type of the auto object (if it exists) |
| Has Chart | Boolean if object has chart |
| Inside Active Zone | Boolean if object inside active zone |
| Fill Colour | The colour of the shape |
| Column Header | Boolean if object is detected as column header |
| Row Header | Boolean if object is detected as row header |
| Outer | Boolean if object is detected as outer |
| Text | Boolean if object is detected as text |
| Chart | Boolean if object is detected as chart |
| Sub Title | Boolean if object is detected as sub title |
| Title | Boolean if object is detected as title |
| Image | Boolean if object is detected as image |
| Background | Boolean if object is detected as background |
| Separators and Lines | Boolean if object is detected as separators |
| Thinkcell | Boolean if object has a thinkcell ® tag |
| Marvin | Boolean if object has a marvin ® tag |
| Text Runs Lengths | — |
| Character Count | — |
| Font Size Min | — |
| Font Size Max | — |
| Area | Area of object (width*height) |
| Relative Area | Area divided by total area of slide |
| Large Shape | A boolean that indicates if the object is large as predefined by user or developer |
| Outside AZ | A boolean that indicates if the object is outside an active zone |
| Same Vertical Rank | A boolean that indicates if x rank and right rank are the same |
| Same Horizontal Rank | A boolean that indicates if the object if y rank and bottom rank are the same |
| $Y_{0\ initial}$ | The result of initial slide-table screening model |

Referring back to FIG. 11, once the output classifications vectors ("Y") of the table detection models are generated—the output classifications vectors ("Y") are then fed into the table transformation models, at 310d.

The table transformation models 310d receive two inputs for each slide object shape: (i) the slide object metadata; and (ii) the corresponding output classification vector ("Y") for that slide object. The table transformation models 310d modify the property features of all slide objects belonging to a table (i.e., as determined from their output vector Y) using a rule-based and optimization approach.

The output (X') is then a transformed slide metadata which comprises a list of the same individual shapes and all their updated properties (e.g., position, dimension, type, color, font, font size, length of text, etc.).

Figure 13:
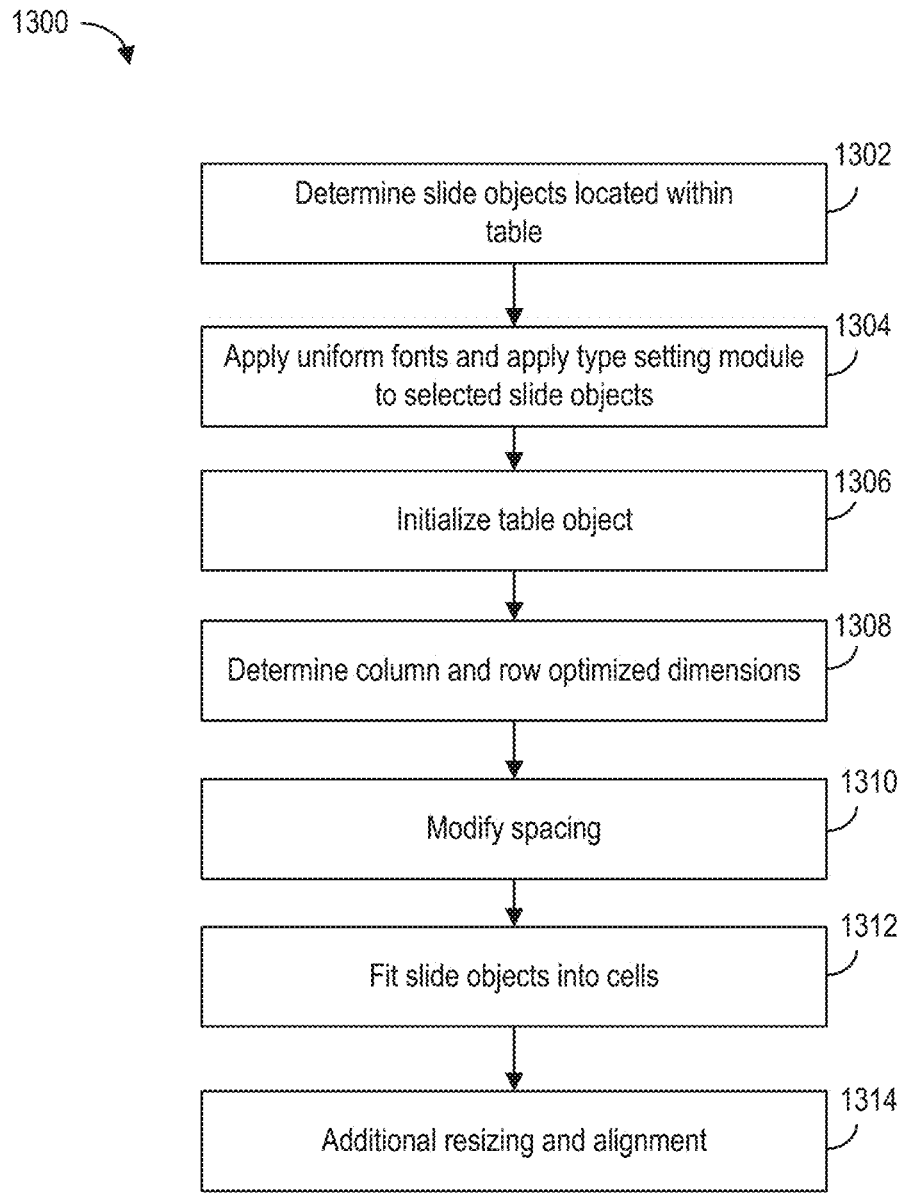
FIG. 13 is an example method for transforming table structures in presentation slides.

Reference is now made to FIG. 13, which shows an example method 1300 for transforming table properties.

At 1302, a determination is made as to which slides objects are located within a table. For example, this can be determined from their respective output classification vectors "Y". For instance, slide objects having vector "Y" with $Y_1$="1" are associated with a table.

Figure 14A:
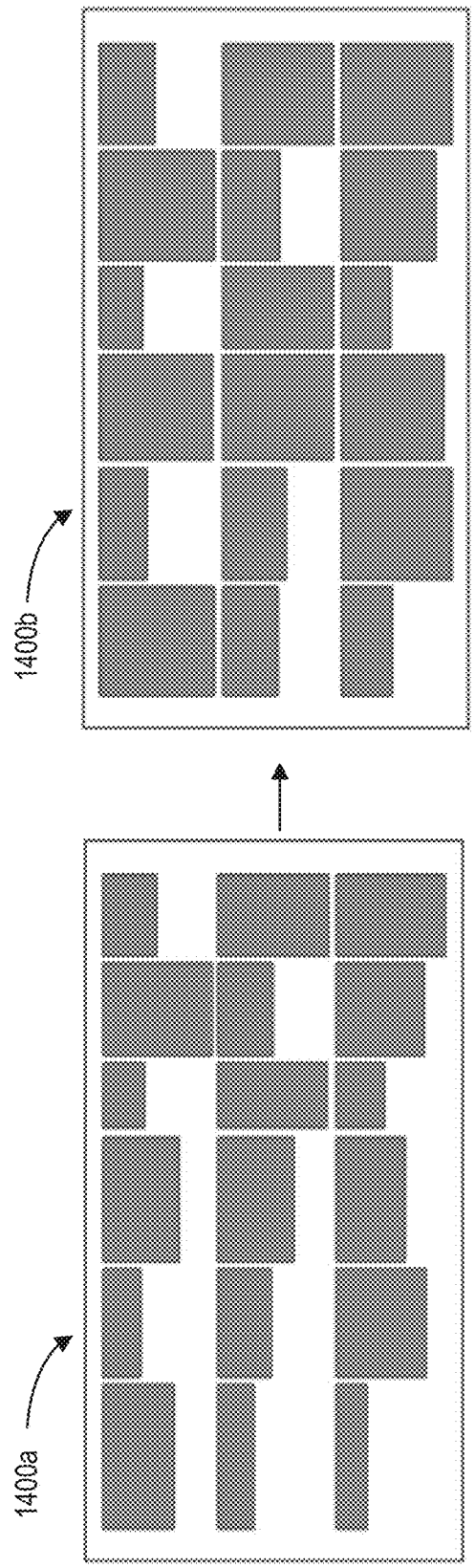
FIGS. 14A-14B are example visualizations of transformed table structures.

At 1304, uniform fonts are applied to all the selected slide objects (e.g., set all fonts to the same size). Further, a type setting module is applied to the selected slide objects. The typesetting module is a function that emulates the 'autofit' behavior of PowerPoint® textboxes. In particular, the height of a textbox is calculated automatically to fit exactly the text, based on font, font size, and width (see e.g., 1400a and 1400b in FIG. 14A).

At 1306, a table object module is initialized for all slide shapes with $Y_1$=1. This involves gathering shapes with $Y^1$=1, and using variable $Y_2$ in the right cell abstraction.

Figure 14B:
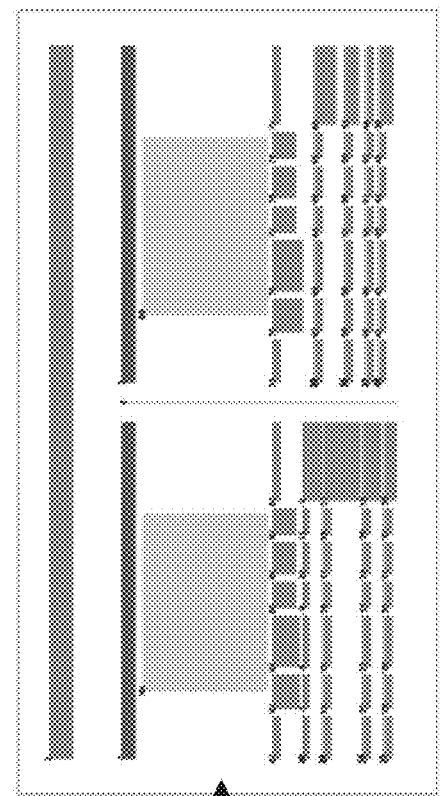

At 1308, computes optimized column widths and rows heights, which are then fixed. In some examples, optimum search is based on standard open source optimization libraries, using a target function and returns font size (see e.g., 1402a and 1402b in FIG. 14B).

At 1310, correct spacing is applied. At 1312, slide objects are fit inside cells, which involves column shape resizing, and row shape resizing. At 1314, textboxes font size is modified to maximize font size, and alignment of separators and background is further performed.

Figure 15A:
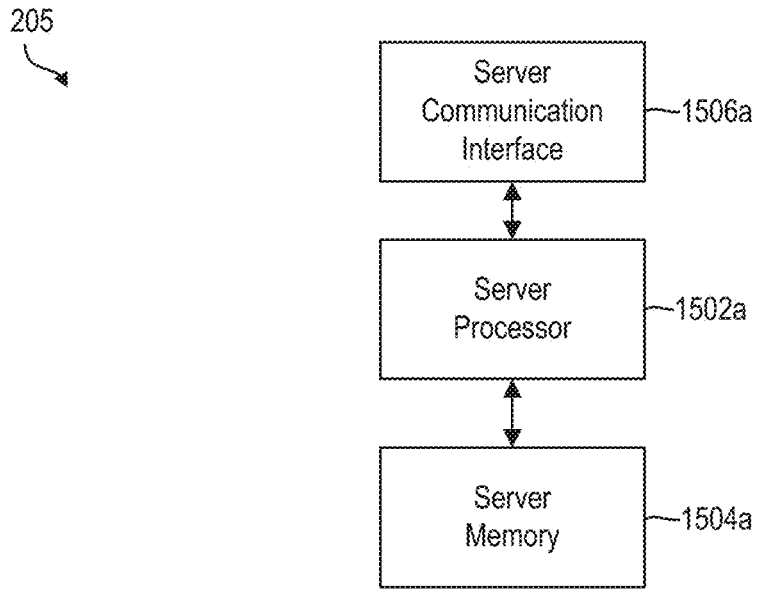
FIG. 15A is a simplified block diagram of an example server, according to some embodiments.

Reference is now made to FIG. 15A, which shows a simplified block diagram of an example server 205. As shown, the server 205 can include a server processor 1502a in communication, via a computer data bus, with a server memory 1504a and a server communication interface 1506a.

Server processor 1502a is a computer processor, such as a general purpose microprocessor. In some other cases, processor 1502a may be a field programmable gate array, application specific integrated circuit, microcontroller, or other suitable computer processor.

Processor 1502a is coupled, via a computer data bus, to memory 1504a. Memory 1504a may include both volatile and non-volatile memory. Non-volatile memory stores computer programs consisting of computer-executable instructions, which may be loaded into volatile memory for execution by processor 1502a as needed. It will be understood by those of skill in the art that references herein to server 205 as carrying out a function or acting in a particular way imply that processor 1502a is executing instructions (e.g., a software program) stored in memory 1504a and possibly transmitting or receiving inputs and outputs via one or more interface. Memory 1504a may also store data input to, or output from, processor 1502a in the course of executing the computer-executable instructions. In at least some embodiments, memory 1504a may store the slide formatting system 102.

Communication interface 1506a is one or more data network interface, such as an IEEE 802.3 or IEEE 802.11 interface, for communication over a network.

Figure 15B:
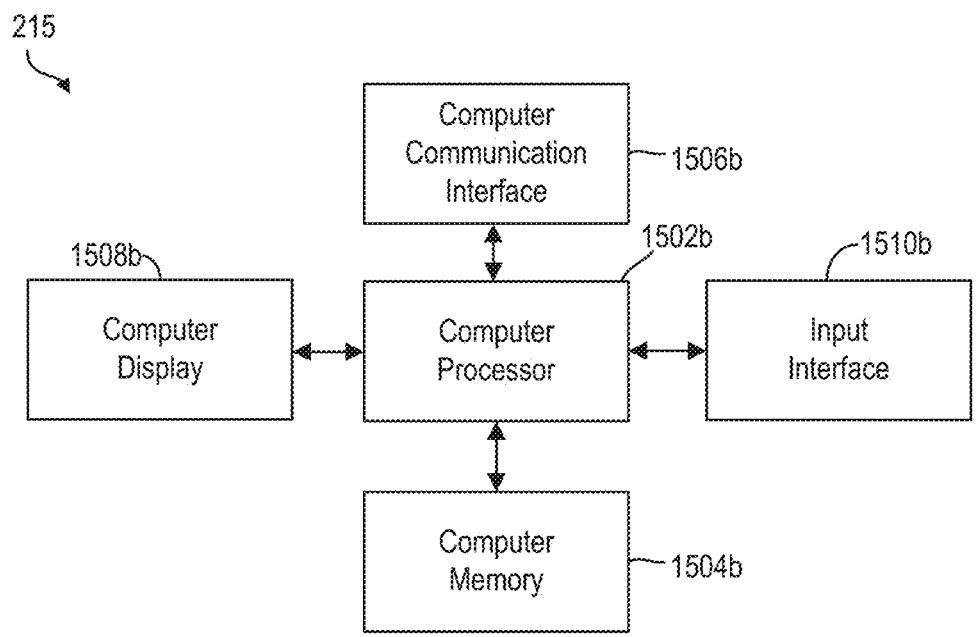
FIG. 15B is a simplified block diagram of an example computer terminal, according to some embodiments.

Reference is now made to FIG. 15B, which shows a simplified block diagram of an example computer terminal. As shown, the computer terminal 215 may also include a computer processor 1502b in communication, via a computer data bus, with a computer memory 1504b, a computer communication interface 1504b and a computer display 1508b.

Computer processor 1502b, memory 1504b and communication interface 1506b may be generally analogous to the server processor 1502a, server memory 1504a and server communication interface 1506a. In some embodiments, the slide formatting system 102 may be stored on the computer memory 1504b in addition, or in alternative, to being stored on the server processor 1502a.

In some cases, the slide formatting system 102 may have a server-side component that is stored on the server memory 1504a and a client-side component that is stored on the computer memory 1504b, whereby the server-side and client-side components may communicate with each other via the network 210. The client-side component, of the slide formatting module 102, may have a GUI that displays to the user on the computer display 1508b. Computer display 1508b may be any suitable display screen (i.e., an LED screen). In some cases, the computer 215 may also include an input interface 1510*b* coupled to the processor 1502*b*, which may include a keyboard, mouse, etc.

Various systems or methods are described above to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. As used herein, two or more components are said to be "coupled", or "connected" where the parts are joined or operate together either directly or indirectly (i.e., through one or more intermediate components), so long as a link occurs. As used herein and in the claims, two or more parts are said to be "directly coupled", or "directly connected", where the parts are joined or operate together without intervening intermediate components.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming or script-based programming. Accordingly, the program code may be written in Java, Swift/Objective-C, C, C++, Javascript, Python, SQL or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be distributed in an over-the-air or wireless manner, using a wireless data connection.

The term "software application" or "application" or "software program" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A software application or program can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications or programs may be deployed to and installed on a computing device on which it is to operate.

Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for automatic formatting of presentation slides, comprising:
   receiving an input slide comprising one or more slide objects, wherein the input slide has a first slide layout configuration;
   determining metadata associated with the input slide, the determined metadata comprising property features of the one or more slide objects;
   analyzing the metadata to detect the one or more slide objects;
   determining one or more slide layout functional objectives;
   based on the one or more slide layout functional objectives, applying one or more transformations to the detected slide objects, wherein each transformation comprises modifying the metadata corresponding to the one or more detected slide objects to generate a corresponding one or more transformed slide objects, each detected slide object being associated with a corresponding transformed slide object; and
   generating a transformed output slide, the transformed output slide comprising the one or more generated transformed slide objects, the transformed output slide having a second slide layout configuration,
   wherein analyzing the metadata to detect the one or more slide objects comprises applying one or more trained slide object detection models;
   wherein the one or more slide object detection models receive inputs comprising property features and derived property features associated with one or more slide objects, and the derived property features are determined from the one or more property features associated with the one or more slide object; and
   wherein the one or more slide object detection models comprise one or more table detection models, and analyzing the metadata using the one or more table detection models comprises:
      applying pair-wise column and row prediction models;
      generating column and row graph representations;
      extracting column and row graph features from the column and row graph representations;
      applying a trained object-in-table detection prediction model to each slide object to generate a first prediction variable;
      applying an object-in table position model to each slide object to generate a second prediction variable; and
      generating an output classification vector comprising the first and second prediction variables.

2. The method of claim 1, wherein the slide objects comprise one or more of a table structure, a grid structure or an outer element, and wherein the outer elements comprises one or more of a title, subtitle, sticker, tracker, footnote and source note.

3. The method of claim 1, wherein for each slide object, the corresponding metadata comprises one or more of a slide object identifier, geometric properties of the slide object, a slide object type, a placeholder, a slide object appearance order and textual properties associated with the slide object.

4. The method of claim 1, wherein the trained models comprise random forest models.

5. The method of claim 1, further comprising:
   applying a slide-level table prediction model to each slide object to generate a third prediction variable; and
   generating the output classification vector to further comprise the third prediction variable.

6. The method of claim 5, further comprising:
   applying one or more trained screening models to generate one or more initial prediction variables; and
   inputting the one or more initial prediction variables as input features into the one or more table detections models.

7. The method of claim 1, further comprising:
   determining, based on the one or more trained slide detection models, a slide object type;
   selecting one or more transformation models corresponding to that slide object type; and
   applying the one or more selected transformation models to the slide object.

8. A system for automatic formatting of presentation slides, comprising:
   a communication network;
   a computer comprising an input interface for receiving an input slide and a communication interface for transmitting the input slide over the communication network;
   a server, the server comprising a server processor configured to:
      receive the input slide over the communication network, the input slide comprising one or more slide objects, wherein the input slide has a first slide layout configuration;
      determine metadata associated with the input slide, the determined metadata corresponding to property features of the one or more objects;
      analyze the metadata to detect the one or more slide objects;
      determine one or more slide layout functional objectives;
      based on the one or more slide layout functional objectives, apply one or more transformations to the detected slide objects, wherein each transformation comprises modifying the metadata corresponding to the one or more detected slide objects to generate a corresponding one or more transformed slide objects, each detected slide object being associated with a corresponding transformed slide object; and
   generate a transformed output slide, the transformed output slide comprising the one or more generated transformed slide objects, the transformed output slide having a second transformed slide layout configuration, wherein analyzing the metadata to detect the one or more slide objects comprises the server processor being further configured to: apply one or more trained slide object detection models;

wherein the one or more slide object detection models receive inputs comprising property features and derived property features associated with one or more slide objects, and the derived property features are determined from the one or more property features associated with the one or more slide object; and wherein the one or more slide object detection models comprise one or more table detection models, and analyzing the metadata using the one or more table detection models comprises the server processor being further configured to:
- apply pair-wise column and row prediction models;
- generate column and row graph representations;
- extract column and row graph features from the column and row graph representations;
- apply a trained object-in-table detection prediction model to each slide object to generate a first prediction variable;
- apply an object-in table position model to each slide object to generate a second prediction variable; and
- generate an output classification vector comprising the first and second prediction variables.

9. The system of claim 8, wherein the slide objects comprise one or more of a table structure, a grid structure or an outer element, and wherein the outer elements comprises one or more of a title, subtitle, sticker, tracker, footnote and source note.

10. The system of claim 8, wherein for each slide object, the corresponding metadata comprises one or more of a slide object identifier, geometric properties of the slide object, a slide object type, a placeholder, a slide object appearance order and textual properties associated with the slide object.

11. The system of claim 8, wherein the trained models comprise random forest models.

12. The system of claim 8, wherein the server processor is further configured to:
- apply a slide-level table prediction model to each slide object to generate a third prediction variable; and
- generate the output classification vector to further comprise the third prediction variable.

13. The system of claim 12, wherein the server processor is further configured to:
- apply one or more trained screening models to generate one or more initial prediction variables; and
- input the one or more initial prediction variables as input features into the one or more table detections models.

14. The system of claim 8, wherein the server processor is further configured to:
- determine, based on the one or more trained slide detection models, a slide object type;
- select one or more transformation models corresponding to that slide object type; and
- apply the one or more selected transformation models to the slide object.

* * * * *